US012762412B2

(12) United States Patent
Shao et al.

(10) Patent No.: US 12,762,412 B2
(45) Date of Patent: Oct. 13, 2026

(54) ADAPTIVE QUANTIZATION METHOD FOR ANALOG IN-MEMORY COMPUTING SYSTEMS

(71) Applicant: The Hong Kong University of Science and Technology, Kowloon (HK)

(72) Inventors: Qiming Shao, Kowloon (HK); Zhihua Xiao, Kowloon (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 414 days.

(21) Appl. No.: 18/645,777

(22) Filed: Apr. 25, 2024

(65) Prior Publication Data

US 2025/0117661 A1 Apr. 10, 2025

Related U.S. Application Data

(60) Provisional application No. 63/589,033, filed on Oct. 10, 2023.

(51) Int. Cl.
*G06N 3/084* (2023.01)

(52) U.S. Cl.
CPC .................................. *G06N 3/084* (2013.01)

(58) Field of Classification Search
CPC .............................. G06N 3/084; G06N 3/065
See application file for complete search history.

(56) References Cited

U.S. PATENT DOCUMENTS 11,423,315 B2 8/2022 Chang et al.
2008/0158936 A1* 7/2008 Bertin .................... B82Y 10/00 257/E21.666
2020/0327406 A1* 10/2020 Piveteau ............. G06N 3/0464
2021/0294874 A1 9/2021 Tang et al.

OTHER PUBLICATIONS

Xiao, et al. "Device Variation-Aware Adaptive Quantization for MRAM-based Accurate In-Memory Computing Without On-chip Training" 2022 International Electron Devices Meeting (IEDM). IEEE, 2022, 4 pages.

(Continued)

*Primary Examiner* — Christopher E Dunay
(74) *Attorney, Agent, or Firm* — Amin, Turocy & Watson, LLP

(57) ABSTRACT

One or more systems, methods and/or machine-readable mediums are described herein for adaptively quantizing the parameters that are aimed to be deployed on in-memory computing systems based on magnetic memory devices. The method includes quantizing parameters based on a conductance shift sensing process, a sensed conductance shift value, a conductance shift lookup table, and a parameter to be quantized. The parameter can be quantized by using a value recorded in the lookup table, such as rounding to the nearest value. The lookup table can be generated by the conductance shift sensing process which can enabling recording of a sensed conductance of a magnetic memory device and an associated device state. The conductance shift sensing process can set the magnetic memory device (MMD) to different states and can measure the conductance shift of the MMD, caused by the state setting, using suitable equipment.

20 Claims, 18 Drawing Sheets

(56) References Cited

OTHER PUBLICATIONS

Zhang, et al. "Statistical Computing Framework and Demonstration for In-memory Computing Systems" DAC '22: Proceedings of the 59th ACM/IEEE Design Automation Conference Jul. 2022 pp. 979-984 https://doi org/10.1145/3489517.3530557.
Zhang, et al. "Neural Network Training With Stochastic Hardware Models and Software Abstractions" IEEE Transactions on Circuits and Systems-I: Regular Papers, vol. 68, No. 4, Apr. 2021, 11 pages.
Chang, et al. "Device quantization policy in variation-aware in-memory computing design" Scientific Report 12(1), Jan. 2022, 13 pages.

* cited by examiner

ADAPTIVE QUANTIZATION FINE-TUNING (700)

ADAPTIVE QUANTIZATION METHOD FOR ANALOG IN-MEMORY COMPUTING SYSTEMS

CROSS-REFERENCE TO RELATED APPLICATIONS

The present application claims the benefit of priority to U.S. Provisional Patent Application No. 63/589,033, filed Oct. 10, 2023, and entitled "An Adaptive Quantization Method for Analog In-Memory Computing Systems", the entirety of which priority application is hereby incorporated by reference herein.

BACKGROUND

In-memory computing (IMC) architecture can provide a framework for system operation, such as running calculations, entirely within computer memory (e.g., random-access memory or RAM).

SUMMARY

The following presents a summary to provide a basic understanding of one or more embodiments described herein. This summary is not intended to identify key or critical elements, or to delineate any scope of the particular embodiments and/or any scope of the claims. The sole purpose of the summary is to present concepts in a simplified form as a prelude to the more detailed description that is presented later.

In one or more embodiments described herein, e.g., devices, systems, methods and/or machine-readable mediums are described that can facilitate a framework for system operation, such as running calculations, entirely within computer memory (e.g., random-access memory or RAM). For example, one or more embodiments described herein can employ magnetic memory devices (MMDs) to adaptively quantize parameters of an analog IMC system.

According to an embodiment, a method comprises quantizing neural network parameters at a magnetic memory device (MMD), executing first calibrations of the parameters, wherein the first calibrations comprise determining a first error resulting from a first forward calculation pass of first data using the parameters and backpropagating first error to update the parameters, wherein the first calibrations are executed using selectively increasing levels of noise added to the parameters prior to the forward calculation pass, and wherein the executing the first calibrations results in initially calibrated parameters, determining a conductance error of the MMD, based on a specified state of the MMD and based on a sensed conductance of the MMD, resulting in a determined conductance shift of the MMD, and tuning the initially calibrated parameters using the determined conductance shifts of the MMD, resulting in primarily trained parameters.

According to another embodiment, a system comprises at least one memory that stores computer executable components, and at least one processor that executes the computer executable components stored in the at least one memory to perform operations comprising determining conductance errors of memory cells of a magnetic memory device (MMD) based on a specified state of the MMD and based on sensed conductances of the memory cells at the specified state, resulting in a plurality of known conductance shifts of the MMD, and tuning a plurality of initially calibrated parameters of a neural network, the tuning comprising mapping the plurality of initially calibrated parameters to the memory cells using the plurality of known conductance shifts of the MMD, resulting in a set of primarily trained parameters.

According to yet another embodiment, a non-transitory machine-readable medium can comprise executable instructions that, when executed by a processor facilitate performance of operations, comprising based on input data obtained via a neural network, generating output data using the neural network, wherein parameters of the neural network have been calibrated, tuned, and quantized at memory cells of a magnetic memory device (MMD), and wherein in-memory calculation at the MMD is employed to generate the output data, and prior to quantizing the parameters at the MMD, and prior to generating the output data, executing a training of the parameters by updating the parameters based on backpropagation of error determined using the parameters and subsequently tuning the parameters based on determined conductance shifts of the memory cells of the MMD.

A benefit of the aforementioned system, non-transitory machine-readable medium, and/or computer-implemented method can be an ability to employ less hardware, as compared to existing frameworks, to support the performance and throughput specifications, such as service level agreements (SLAs). That is, by employing an adaptive quantization method described herein, better data center consolidation, reduced capital costs, and/or reduced operational and/or infrastructure overhead can be obtained. In connection therewith, a lifetime of existing hardware and software can be increased by enabling increased performance using currently employed hardware with the one or more embodiments described herein for adaptive quantization-based IMC.

Furthermore, as compared to existing IMC approaches, the one or more embodiments described herein can provide for more accurate output and/or reduced (multiply and accumulation) MAC error in an analog IMC system.

Another benefit of the aforementioned system, non-transitory machine-readable medium, and/or computer-implemented method can be an ability to greatly reduce the multiplication and accumulation (MAC) in analog in-memory computing systems. In one or more cases, a deep neuron network model optimized by this method can maintain high accuracy under significant memory device variations and circuit noise.

DESCRIPTION OF THE DRAWINGS

Numerous embodiments, objects, and benefits of the present embodiments will be apparent upon consideration of the following detailed description, taken in conjunction with the accompanying drawings, in which like reference characters refer to like parts throughout.

DETAILED DESCRIPTION

Figure 1:
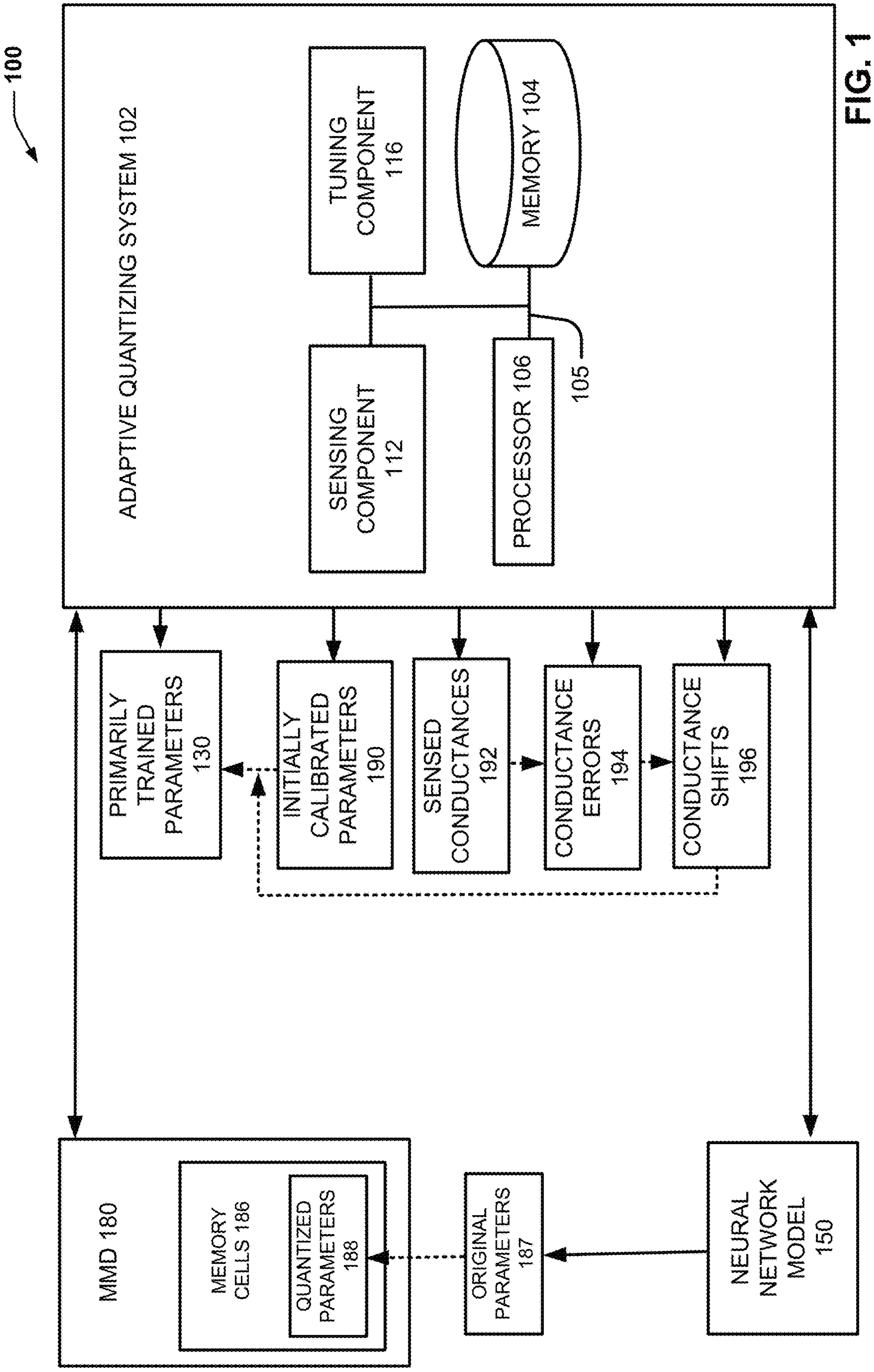
FIG. 1 illustrates an exemplary diagram of a device comprising an adaptive quantizing system, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

Overview

In-memory computing, also herein referred to as in-memory computation or IMC, refers to a framework for system operation, such as running calculations, entirely within computer memory (e.g., random-access memory or RAM). RAM storage and parallel distributed processing are two fundamental pillars of IMC. That is, the in-memory computation can be performed using in-memory data grids (IMDG) to allow for operating complex computations on large datasets across a cluster of hardware. That is, in one or more cases, IMC can be employed to perform complex calculations across a cluster of computers, where RAM of the cluster of computers is pooled together. The in-memory grids (IMG), at which the computations can be performed, can be comprised by the memory of one or more of the cluster of computers.

The IMC can therefore leverage the collective RAM space of the cluster of computers to perform the complex calculations. In one or more embodiments, the collective RAM space can be referred to as a shared memory space of shared in-memory data.

Use of IMC can reduce and/or eliminate the input/output (I/O) requirements and/or the atomicity, consistency, isolation, and durability (ACID) transaction requirements of online transaction processing (OLTP) applications. The use of IMC can exponentially speed data access because RAM-stored data can be available instantaneously, while data stored on disks can be limited by network and disk speeds. IMC can cache massive amounts of data, enabling extremely fast response times, and store session data, which can help achieve optimum performance. Accordingly, benefits of use of IMC, as compared to accessing hard disk drives or solid-state drives (SSDs), can include a reduction in latency common with such disk drives. That is, use of IMC can reduce and/or eliminate slow data accesses by, at least in part, relying on data stored in RAM.

The computations performed by IMC can be managed by one or more of the computers having RAM of the stored data space and/or by one or more other computers. That is, software on these one or more computers and/or one or more other computers can, where suitable, segregate (e.g., divide) a complex computation into two or more smaller tasks that can be distributed out to other computers having RAM of the stored data space. The two or more smaller tasks can be performed at least partially in parallel with one another.

IMC can be used for a variety of applications that include, but are certainly not limited to, financial evaluations, weather tracking, geographical change monitoring, statistical polling, counterparty risk evaluating, and/or the like. Indeed, IMC can often be employed where large quantities of data are being analyzed, such as to determine one or more patterns changing over a time range based on one or more parameters that themselves can be changed and/or evolve over the time range.

Put another way, in-memory computing (IMC) architecture can aim to solve an energy and speed bottleneck, such as for conventional von Neumann architecture in existing data-intensive artificial intelligence (AI) applications. One intensive operation in existing deep neural networks (DNNs) is large-scale general matrix multiplication (GEMM). While development of modern AI applications is pushing the hardware into both computation and data movement limits, IMC architectures are becoming even more important to further improve the performance for accelerating GEMMs on hardware by solving both computation and data access bottlenecks.

Analog IMC can provide more efficient GEMM operations than digital accelerators. Based on Ohm's law and Kirchhoff's current law, analog multiplication and addition can be processed simultaneously by activating multiple columns in memory crossbars of RAM. In this way, results can be directly obtained by sensing output current or voltage of the memory crossbars. However, this computation scheme introduces a deficiency such that the analog computation must be robust to noise and variations in a large crossbar array, of which can have a variety of architectures due to hardware-introduced variation. In addition to the hardware-introduced variation, compact, low-bit represented IMC networks are intrinsically less robust than larger, full-precision IMC networks due to less redundant parameters. Accordingly, scaling also provides a bottleneck factor in determining noise tolerance ability of the hardware.

can be to perform in-situ learning. This can comprise bringing the software training to the hardware, which can naturally include variation during the training. This method has been explored on static random-access memory (SRAM)-based IMC. However, for emerging non-volatile memories (eNVMs) such as phase change memory (PCM), resistive random-access memory (RRAM), and/or magnetic random-access memory (MRAM), a shorter endurance of such devices can cause such devices to be incompatible with in-situ learning. It is noted that even where the variation issue can be attempted to be mitigated, by training the DNNs from an ex-situ approach with some simulated variations based on statistical analysis to increase the network robustness, variation deficiencies still exist in existing frameworks.

Stated briefly, the dying of Moore's law and the crucial challenge of the memory bottleneck of von Neumann architecture limit the development of computing hardware in artificial intelligence and scientific computing areas. Accordingly, a deeper level of hardware-software co-design and how the co-design scheme can improve the performance and accuracy of existing IMC systems (e.g., IMCs), considering the inherent variation in the MRAM analog IMCs, can be desired.

To account for one or more of the above-noted deficiencies, one or more embodiments described herein provide a framework for using a conductance shift sensing process to sense the conductance shift of memory cells of a memory device (e.g., RAM).

One or more embodiments described herein can provide for use of unique (e.g., typical and/or non-ideal) variation of magnetic memory devices for adaptive quantization of parameters in analog IMC systems. In connection therewith a conductance shift sensing process can be performed to directly sense a conductance shift of each memory cell of a specified memory device. A device-specific conductance shift sensing look-up table can be generated based on the sensed device conductance shifts.

A subsequent adaptive quantization process can adjust the parameters in the analog IMC system according to the device-specific conductance shift sensing lookup table. This adaptive quantization process can minimize IMC calculation error (e.g., MAC error) related to employing the memory cells. The adaptive quantization approach discussed herein can be employed with unique memory devices, e.g., non-ideal memory devices and/or memory devices having various hardware variations, which hardware variations are not able to be represented in existing quantization methods.

More particularly, using an adaptive quantization approach discussed herein, quantization parameters, stored in one or more memory cells of the memory devices, can be calibrated based on capturing noise of the memory devices to be employed for IMC. The calibration process can be performed off-chip, without use of on-chip write or read cycles. This can enable faster, more efficient, more accurate and more hardware-friendly use of the one or more frameworks described herein, as compared to existing frameworks.

Accordingly, provided is a method for adaptively quantizing a set of parameters that are aimed to be deployed on an analog in-memory computing system. The method comprises quantizing parameters based on a pretraining process, a conductance shift sensing process, a sensed conductance shift value, generating a conductance shift lookup table, an iterative adaptive quantization process.

In one or more embodiments, a parameter can be quantized by rounding to the nearest value recorded in the lookup table. The lookup table can be obtained by the conductance shift sensing process, which process can record the sensed conductance of each magnetic memory device and the associated device state. The conductance shift sensing process can set the memory device to different states and measures the conductance shift with the necessary equipment. The method can optimize the parameters according to the sensed conductance shift values. Thus, the method can greatly reduce the multiplication and accumulation (MAC) in analog in-memory computing systems. In one or more cases, a deep neuron network model optimized by this method can maintain high accuracy under significant memory device variations and circuit noise.

Example Embodiments

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, one or more devices, systems and/or apparatuses thereof can further comprise one or more computer and/or computing-based elements described herein with reference to an operating environment, such as the operating environment 1700 illustrated at FIG. 17. In one or more described embodiments, computer and/or computing-based elements can be used in connection with implementing one or more of the systems, devices, apparatuses and/or computer-implemented operations shown and/or described in connection with one or more figures described herein.

As used herein, "data" can comprise metadata.

As used herein, "use" can comprise access.

As used herein, "cost" can refer to time, money, power, storage, memory, bandwidth, user entity labor and/or the like.

As used herein, the terms "entity," "requesting entity," "user entity," and "administrating entity" can refer to a machine, device, component, hardware, software, smart device, party, organization, individual and/or human.

Turning now to the figures, one or more embodiments described herein can include one or more devices, systems, apparatuses and/or system-implemented methods that can enable a process to provide for use of an adaptively-quantized MMD supporting analysis performed by a NN.

Generally, the one or more embodiments can provide faster, more efficient, more accurate and more hardware-friendly use of the one or more frameworks described herein, as compared to existing frameworks.

Generally, an adaptive quantizing system as described herein can employ conductances sensed from different states of an MMD to tune parameters for being quantized at the MMD. The MMD, with the quantized and tune parameters, can then be employed, using MMD input data (e.g., provided by the NN) to perform IMC resulting in an MMD output for use by the NN in providing a NN output.

Looking first to FIG. 1, a non-limiting system 100 is illustrated that can comprise one or more devices, systems, and/or apparatuses that can enable a process to provide for use of an adaptively-quantized MMD supporting analysis performed by a NN. Generally, the one or more embodiments can provide faster, more efficient, more accurate and more hardware-friendly use of the one or more frameworks described herein, as compared to existing frameworks.

The non-limiting system 100 can comprise an adaptive quantizing system 102 and a magnetic memory device (MMD) 180, either of which can comprise any one or more suitable type of component, machine, device, facility, apparatus, and/or instrument that comprises a processor and/or can be capable of effective and/or operative communication with a wired and/or wireless network. Any one or more such suitable types of components can function in cooperation with another such suitable same or different type of component, as will be detailed below. All such embodiments are envisioned. For example, the adaptive quantizing system 102 can comprise a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device. Likewise, the adaptive quantizing system 102 can be disposed and/or run at any suitable device, such as, but not limited to a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device.

The adaptive quantizing system 102 can be associated with, such as accessible via, a cloud computing environment. For example, the adaptive quantizing system 102 can be associated with a cloud computing environment 1802 described below with reference to illustration 1800 of FIG. 18.

Figure 2:
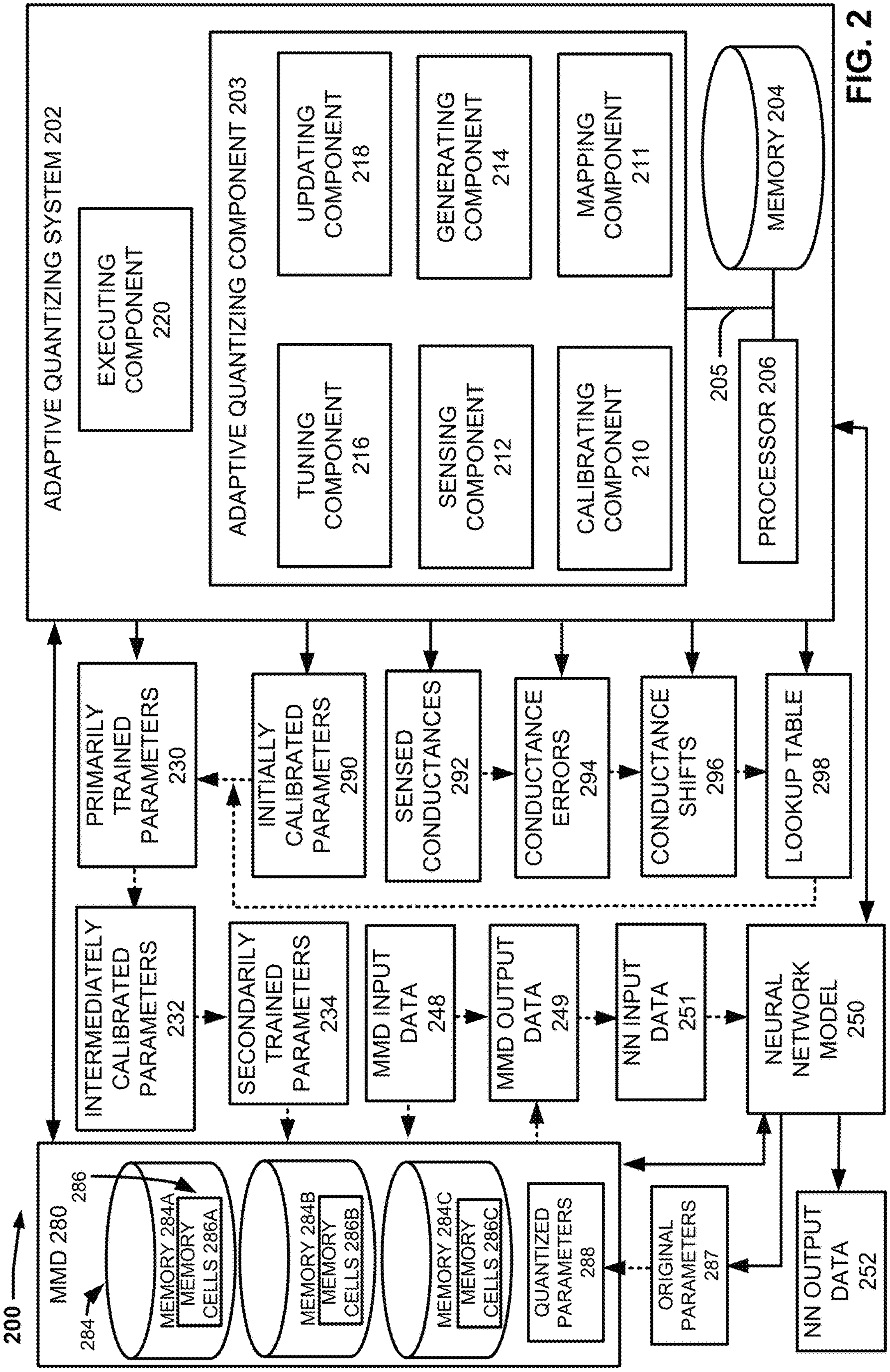
FIG. 2 illustrates an exemplary diagram of another device comprising an adaptive quantizing system, in accordance with one or more embodiments described herein.

It is noted that the adaptive quantizing system 102 is only briefly described relative to FIG. 1 to provide but a lead-in to description of a more complex and/or more expansive adaptive quantizing system 202 as illustrated at FIG. 2. That is, further detail regarding processes that can be performed by one or more embodiments described herein will be provided below relative to the non-limiting system 200 of FIG. 2.

The adaptive quantizing system 102 can comprise at least a memory 104, bus 105, processor 106, sensing component 112 and/or tuning component 116. Using these components and the MMD 180, the adaptive quantizing system 102 can provide for calibration and tuning of parameters to be quantized, or re-quantized, at the MMD, such as for subsequent use in an in-memory computing (IMC) process.

The sensing component 112 can generally determine conductance errors 194 of memory cells 186 of a magnetic memory device (MMD) 180 based on a specified state of the MMD 180 and based on sensed conductances 192 of the memory cells 186 at the specified state, resulting in a plurality of known conductance shifts 196 of the MMD 180.

The tuning component 116 can generally tune a plurality of initially calibrated parameters 190 of a neural network model 150. This tuning can comprise mapping the plurality of initially calibrated parameters 190 to the memory cells 186 using the plurality of known conductance shifts 196 of the MMD 180, resulting in a set of primarily trained parameters 130.

As a result of the tuning, use of the MMD 180 for an IMC process can be more accurate and efficient than through use of original parameters 187 alone (wherein the original parameters 187 were calibrated to obtain the initially calibrated parameters 190, which were then tuned to obtain the primarily trained parameters 130).

Looking next to FIG. 2, a non-limiting system 200 is illustrated that can comprise one or more devices, systems, and/or apparatuses that can enable a process to provide for use of an adaptively-quantized MMD supporting analysis performed by a NN. Generally, the one or more embodiments can provide faster, more efficient, more accurate and more hardware-friendly use of the one or more frameworks described herein, as compared to existing frameworks.

The non-limiting system 200 can comprise an adaptive quantizing system 202, a magnetic memory device (MMD) 280, and a neural network (NN) 250, any of which can comprise any one or more suitable type of component, machine, device, facility, apparatus, and/or instrument that comprises a processor and/or can be capable of effective and/or operative communication with a wired and/or wireless network. Any one or more such suitable types of components can function in cooperation with another such suitable same or different type of component, as will be detailed below. All such embodiments are envisioned. For example, the adaptive quantizing system 202 can comprise a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device. Likewise, the adaptive quantizing system 202 can be disposed and/or run at any suitable device, such as, but not limited to a server device, computing device, general-purpose computer, special-purpose computer, tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players, and/or another type of device and/or computing device.

The adaptive quantizing system 202 can be associated with, such as accessible via, a cloud computing environment. For example, the adaptive quantizing system 202 can be associated with a cloud computing environment 1802 described below with reference to illustration 1800 of FIG. 18.

One or more communications between one or more components of the non-limiting system 200 and/or the adaptive quantizing system 202 can be provided by wired and/or wireless means including, but not limited to, employing a cellular network, a wide area network (WAN) (e.g., the Internet), and/or a local area network (LAN). Suitable wired or wireless technologies for providing the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Arca Networks), Z-Wave, an ANT, an ultra-wideband (UWB) standard protocol, and/or other proprietary and/or non-proprietary communication protocols.

The adaptive quantizing system 202 can comprise at least a memory 204, bus 205, processor 206, calibrating component 210, mapping component 211, sensing component 212, generating component 214, tuning component 116, updating component 218 and/or executing component 220. Using these components and the MMD 280, the adaptive quantizing system 202 can provide for calibration and tuning of parameters to be quantized, or re-quantized, at the MMD, such as for subsequent use in an in-memory computing (IMC) process.

Discussion first turns to the processor 206, memory 204, and bus 205 of the adaptive quantizing system 202.

For example, in one or more embodiments, the adaptive quantizing system 202 can comprise a processor 206 (e.g., computer processing unit, microprocessor, classical processor, and/or like processor). In one or more embodiments, a component associated with the adaptive quantizing system 202, as described herein with or without reference to the one or more figures of the one or more embodiments, can comprise one or more computer and/or machine readable, writable, and/or executable components and/or instructions that can be executed by processor 106 to provide performance of one or more processes defined by such component (s) and/or instruction(s). In one or more embodiments, the processor 206 can comprise the calibrating component 210, mapping component 211, sensing component 212, generating component 214, tuning component 116, updating component 218 and/or executing component 220.

In one or more embodiments, the adaptive quantizing system 202 can comprise a computer-readable memory 204 that can be operably connected to the processor 206. The memory 204 can store computer-executable instructions that, upon execution by the processor 206, can cause the processor 206 and/or one or more other components of the adaptive quantizing system 202 (e.g., the calibrating component 210, mapping component 211, sensing component 212, generating component 214, tuning component 116, updating component 218 and/or executing component 220) to perform one or more actions. In one or more embodiments, the memory 204 can store computer-executable components (e.g., the calibrating component 210, mapping component 211, sensing component 212, generating component 214, tuning component 116, updating component 218 and/or executing component 220).

The adaptive quantizing system 202 and/or a component thereof as described herein, can be communicatively, electrically, operatively, optically, and/or otherwise coupled to one another via a bus 205 to perform functions of non-limiting system 200, adaptive quantizing system 202 and/or one or more components thereof and/or coupled therewith. Bus 205 can comprise one or more of a memory bus, memory controller, peripheral bus, external bus, local bus, and/or another type of bus that can employ one or more bus architectures. One or more of these examples of bus 105 can be employed to implement one or more embodiments described herein.

In one or more embodiments, the adaptive quantizing system 202 can be coupled (e.g., communicatively, electrically, operatively, optically, and/or like function) to one or more external systems (e.g., a non-illustrated electrical output production system, one or more output targets, an output target controller, and/or the like), sources and/or devices (e.g., computing devices, communication devices, and/or like devices), such as via a network. In one or more embodiments, one or more of the components of the adaptive quantizing system 202 can reside in the cloud, and/or can reside locally in a local computing environment (e.g., at a specified location(s)).

In one or more embodiments, the adaptive quantizing system 202 can function as, comprise, or be comprised as part of, a distributed system. That is, a service, software, code, microservice, application and/or the like can be downloaded to one or more devices each comprising a display screen portion. One of the devices can function as a centralized or parent device. screens. In one or more embodiments, the physical connection can be a connection system 210.

In addition to the processor 206 and/or memory 204 described above, adaptive quantizing system 202 can comprise one or more computer and/or machine readable, writable, and/or executable components and/or instructions that, when executed by processor 206, can provide performance of one or more operations defined by such component(s) and/or instruction(s).

Discussion next turns to the additional components of the adaptive quantizing system 202 (e.g., calibrating component 210, mapping component 211, sensing component 212, generating component 214, tuning component 116, updating component 218 and/or executing component 220).

First, it is noted that in one or more embodiments, the calibrating component 210, mapping component 211, sensing component 212, generating component 214, tuning component 116, and/or updating component 218 can be implemented independently, without one or more other of the calibrating component 210, mapping component 211, sensing component 212, generating component 214, tuning component 116, and/or updating component 218. Additionally and/or alternatively, the calibrating component 210, mapping component 211, sensing component 212, generating component 214, tuning component 116, and/or updating component 218 can be comprised by a high-level adaptive quantizing component 203, one or more of the below-described functions of the calibrating component 210, mapping component 211, sensing component 212, generating component 214, tuning component 116, and/or updating component 218 can be performed by the high-level adaptive quantizing component 203, and/or calibrating component 210, mapping component 211, sensing component 212, generating component 214, tuning component 116, and/or updating component 218 can be omitted with the high-level adaptive quantizing component 203 performing one or more of the below-described functions of the one or more omitted calibrating component 210, mapping component 211, sensing component 212, generating component 214, tuning component 116, and/or updating component 218.

Figure 3:
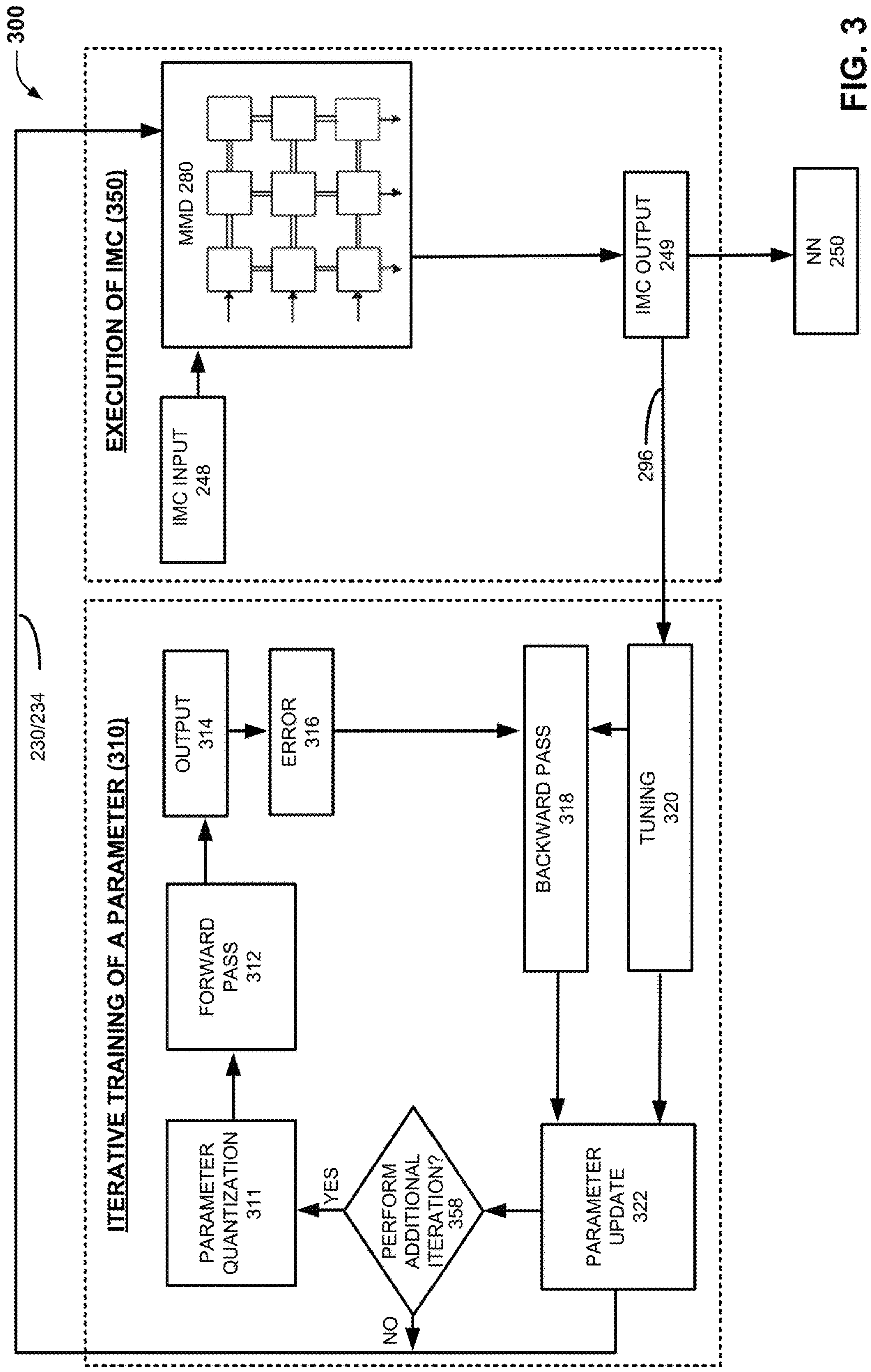
FIG. 3 provides a schematic diagram of one or more processes that can be performed by the adaptive quantizing system of FIG. 2, in accordance with one or more embodiments described herein.

Accordingly, turning first briefly to FIG. 3, illustrated is a schematic diagram detailing a high-level view of a set of training and execution processes that can be performed by the non-limiting system 200 for iterative training 310 of a set of parameters (e.g., comprising calibrating and tuning the set of parameters) and further for execution 350 of IMC using output of the iterative training 310 at the MMD 280 (and/or at any one or more other MMDs to be employed by the one or more NNs 250).

That is, first, a noise-robust, MMD device-irrelevant general model (e.g., a set of parameters) can be trained with a variation aware training (VAT) method. Second, fine-tuning can be performed on the calibrated parameters, using device-specific conductance shifts determined from the MMD 280. Thereafter, the parameters can be employed (e.g., quantized) at the MMD 280.

Turning first to the iterative training 300 at FIG. 3, it is noted that alternatively training models/parameters specialized for each MMD device to be used would be time-consuming and inefficient, as is conducted in existing frameworks. To make up for these deficiencies, the iterative training processes 310 can be used. These processes 310 can be performed for some or all of the memories 284 (e.g., 284A, 284C, 284C) of any one or more MMDs 180 to be employed by one or more neural networks (NNs) 250. Applying this iterative training scheme, the fine-tuning training process on each device can be reduced to a few epochs or even one epoch, making the fine tuning very efficient. Further, using this iterative training scheme, use of the calibrated and trained parameters in a quantized form at the MMD 2180 can allow for more accurate and efficient IMC to be performed, as compared to existing frameworks.

Accordingly, turning first to the calibrating component 210, this component can generally initially calibrate original parameters 287 comprising increasingly adding noise to the original parameters 287, resulting in noisy original parameters, and subsequently employing backpropagation to update the noisy original parameters, the initially calibrating resulting in the plurality of initially calibrated parameters 290. It is noted that initially calibrating the parameters can be performed according to a same process regardless of a number of bits comprised by the original parameters 287. For example, turning briefly to FIG. 3, this same process can comprise parameter quantization 311 at the MMD 280, use of a forward pass 312, determination of one or more errors 316 (e.g., training errors) corresponding to the parameters, and use of a backward pass 318 (e.g., backward propagation). It is noted that each of these processes will be described below in detail. That is, this set of calibrating processes can be a first portion of iterative training processes 310, of which a second portion can be a set of tuning processes, also to be described below in detail. This set of calibrating processes (also herein referred to as calibration processes) can be performed by the calibrating component 210 using the neural network model 250.

That is, turning to FIG. 3, a parameter of an NN model (e.g., NN model 250) can first be quantized (e.g., parameter quantization 311) to a low-bit representation to match an inference on the IMC hardware, including the MMD 280. Then, the quantized parameter can be used to perform a forward pass (e.g., forward pass 312) using the quantized parameter data passed into the NN model 250, and the output 314 can be employed to calculate a training error 316, such as a parameter-specific training error. In one or more cases, the backward pass 318 can be a conventional backpropagation-based gradient update process.

It is noted that a calibration output using the MMD hardware (using an MMD device-specific conductance shift lookup table 298) can be used to determine the parameter update value 322 per each parameter, as will be further detailed below relative to the sensing component 212 and the generating component 214.

It is noted that the NN model 250 can be a deep NN, in one or more embodiments.

The training process of the NN model parameters (e.g., original parameters 287) can be iteratively performed several times until a termination condition is satisfied. In one or more embodiments, the termination condition can be a specified number of iterations, a specified threshold of parameter delta (e.g., a change in parameters between iterations), and/or any other termination condition.

After this training process is completed, the parameters 287 for the DNN model can be converted to the state of the memory device 280 in a corresponding IMC system, thereby resulting in the quantized parameters 288. That is, the original parameters 287 can be stored as the state of the memory device 280 and represented by the conductance of the memory device 280.

Figure 4:
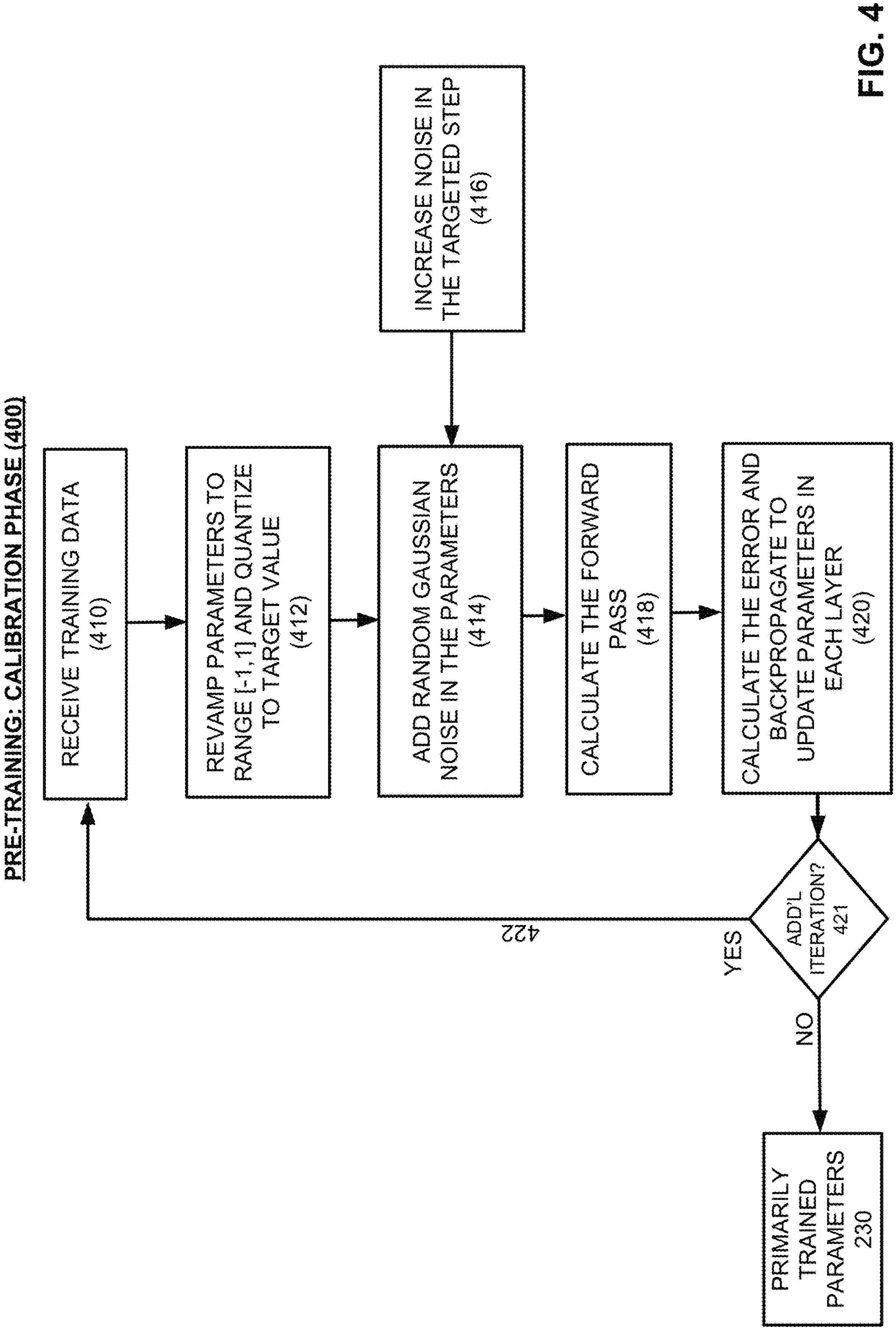
FIG. 4 provides a schematic diagram of one or more pre-training processes that can be performed by the adaptive quantizing system of FIG. 2, in accordance with one or more embodiments described herein.

Turning now to FIG. 4, illustrated is a schematic flow chart 400 further detailing the calibration portion of the pretraining process described above, as can be performed by the calibrating component 210 using the neural network model 250. As illustrated at FIG. 4, first, the training data can be passed to the NN model 250 (e.g., step 410). The parameters can be clipped to range [−1,1] and quantized to low-bit representation values, e.g., to a low-bit representation to match an inference on the IMC hardware (e.g., step 412).

Then, parameters can be modified with noise, such as Gaussian random noise (e.g., step 414), with strength increasing at each of a set of targeted steps (e.g., step 416). For example, the quantized network can be explored to a gradually increase noise, such as that mimics an analog noise to be exhibited in an inference process on-chip, to increase the noise robustness of the parameters, and thus of the NN model 250. In one or more embodiments of the calibration phase of the training procedure 310, $\Delta G_T \sim N(0, \sigma)$ can be used as the training noise. Here, $\Delta G_T$ stands for total conductance shift in the memory devices, N is a normal distribution (Gaussian distribution), and σ is the standard deviation of the Gaussian distribution (also regarded as the strength of the training noise here).

Since it can be impossible to obtain a single optimal model that performs well on all types of MMD hardware variations, instead of training a noise-robust quantized network with a very good performance, this noise-based process can deliberately increase the noise to a very high level to obtain parameters for a general NN model 250 that can provide better accuracy after one-shot tuning than an NN model 250 without noise training.

The forward pass 312 can be performed (e.g., step 418) to calculate the input training data processed by the NN model 250. An error 316 can then be calculated with a target label, and the parameters can be updated with the backpropagation/backward pass 318 (e.g., step 420). This calibration portion of the training process can be iterated for a set of specified target cycles until a termination condition is satisfied. In one or more embodiments, the termination condition can be a specified number of iterations, a specified threshold of parameter delta (e.g., a change in parameters between iterations), and/or any other termination condition. Finally, the resulting initially calibrated parameters 290 of the NN model 250 will be recorded.

As a result of the above calibration portion of the pre-training method, the initially-calibrated parameters 290, which are a prerequisite for a subsequent fine-tuning portion of the iterative training 310, are output. Alternatively, further iteration can be performed, via path 422, such as until the termination condition. In one or more embodiments, the calibrating component 210 can make this determination (e.g., decision step 421) based on the termination condition being satisfied or not satisfied.

The pre-trained model can then be fine-tuned (e.g., fine-tuning phase by the tuning component 216) to complete an iteration of the iterative training 310.

Figure 5:
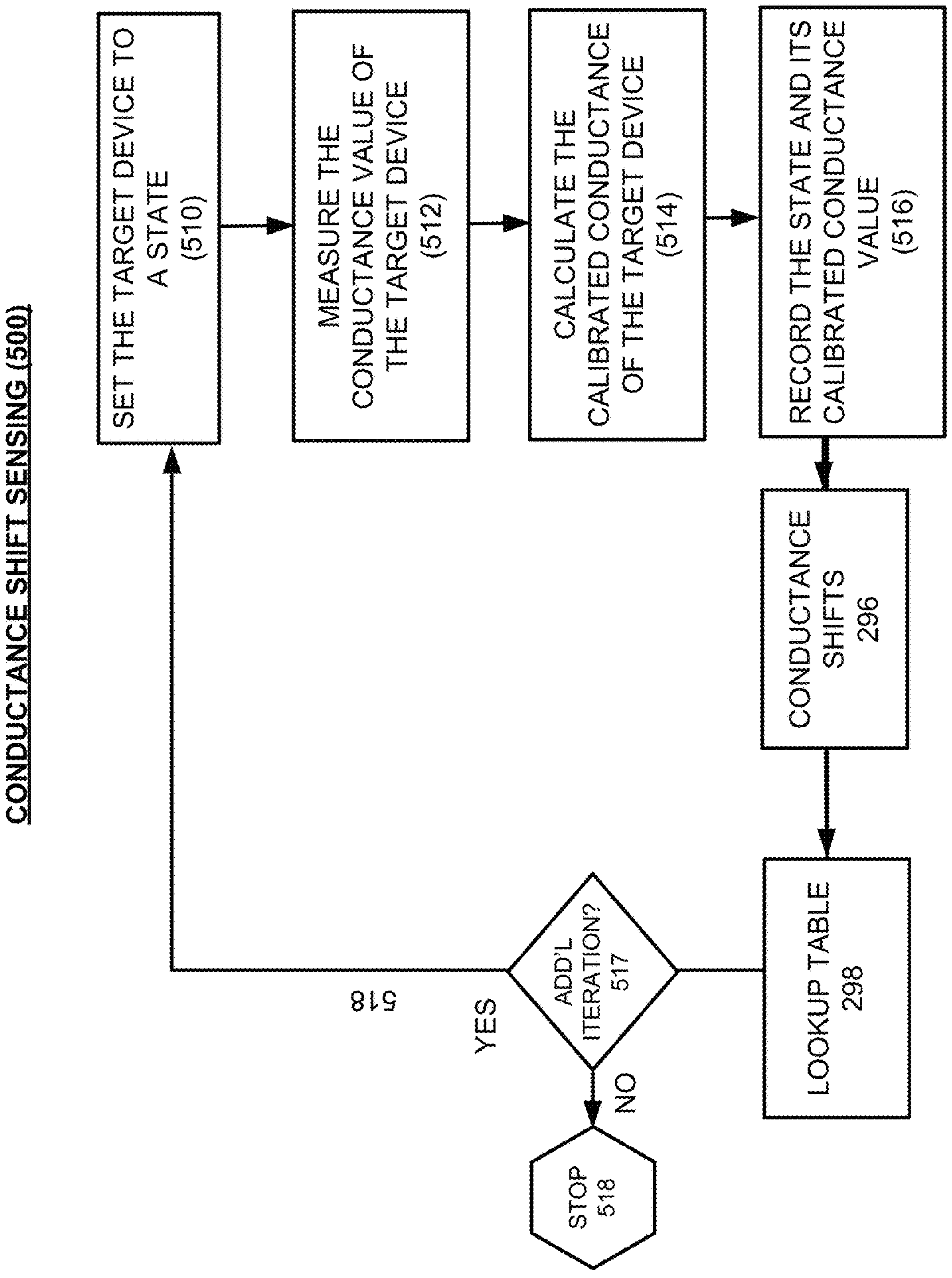
FIG. 5 provides a schematic diagram of one or more conductance shift sensing processes that can be performed by the adaptive quantizing system of FIG. 2, in accordance with one or more embodiments described herein.
Figure 6:
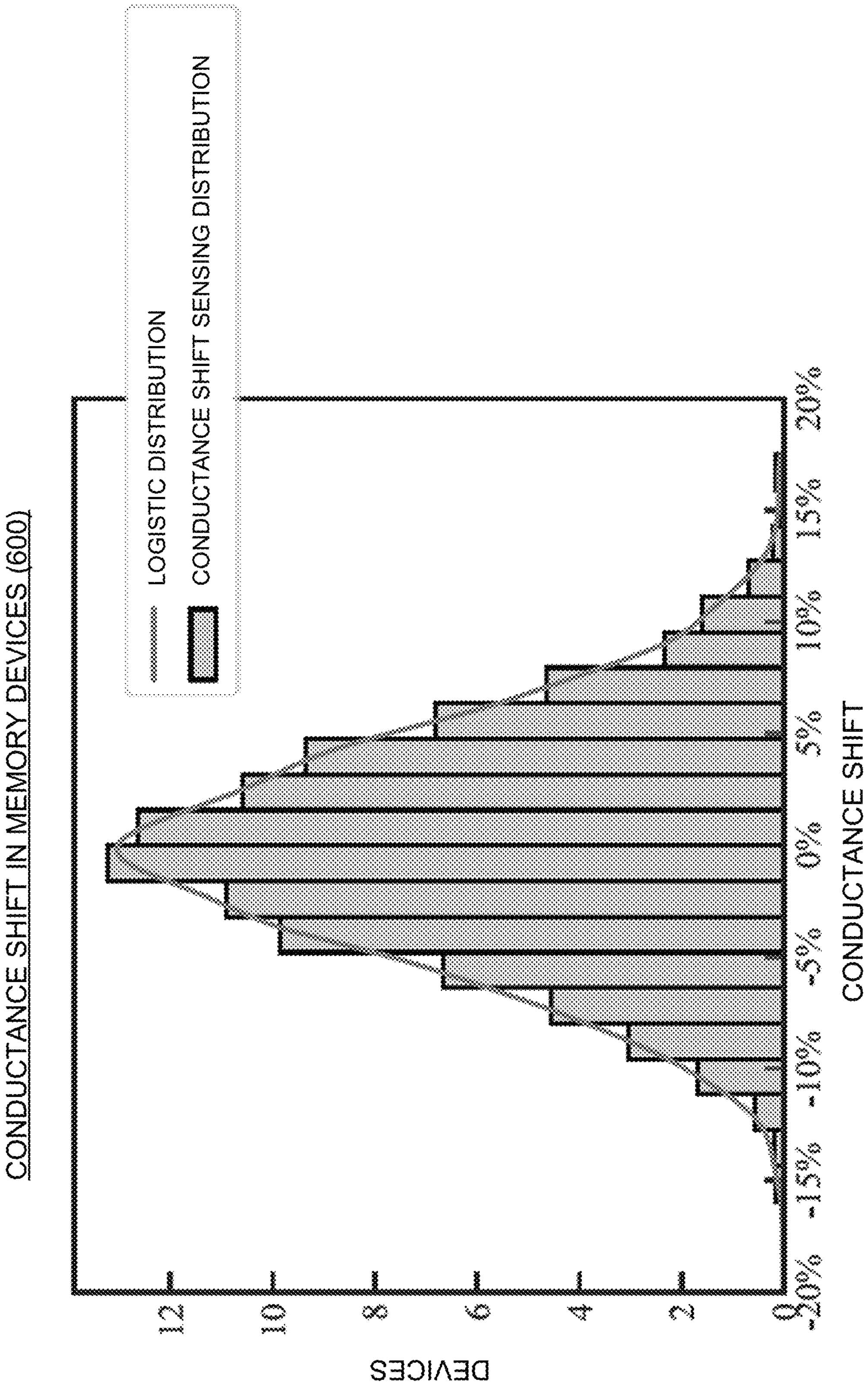
FIG. 6 provides a graphical illustration of conductance shift in memory devices, in accordance with one or more embodiments described herein.
Figure 7:
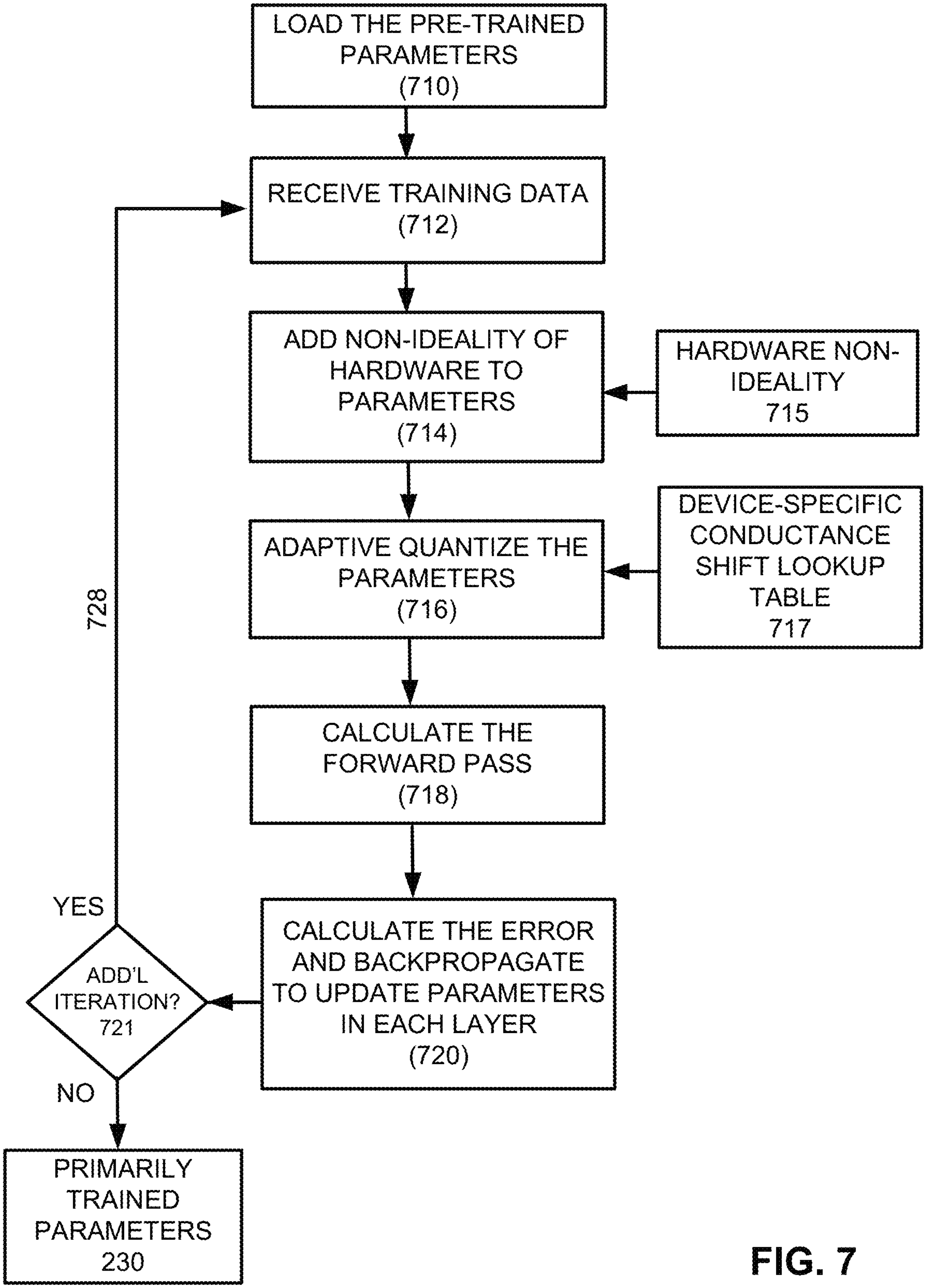
FIG. 7 provides a schematic diagram of one or more adaptive quantization fine-tuning processes that can be performed by the adaptive quantizing system of FIG. 2, in accordance with one or more embodiments described herein.

However, before discussing the one or more fine-tuning processes at FIG. 7, discussion first turns to FIGS. 5 and 6 corresponding to conductance shift sensing 500, which can result in generation of a lookup table 298. In particular, the generation of the lookup table 298 (e.g., by the generating component 214) can be based on determination of one or more device-specific conductance shifts 296 that are based on one or more sensed conductances 292 sensed at the MMD (e.g., upon direction from the sensing component 212).

To set the stage for discussion of determination of the one or more device-specific and/or memory cell-specific conductance shifts 296, description is first provided regarding a parameter mapping scheme that can be employed for the MMD 280 by the mapping component 211.

To describe the parameter mapping scheme, a ternary memory cell case is used here as an example. Using the ternary memory cell case, an n-bit parameter (e.g., n is the bit number of the parameter) can be stored in two memory cells 286. The real value of a corresponding weight W can be calculated using Equation 1.

$$W=\sum_{i=1}^{n} G_i \times 2^{i-1} G \in (-1, 0, 1) \qquad \text{Equation 1}$$

At Equation 1, $G_i$ is the conductance of each differential pair, and it is normalized to G∈(−1, 0, 1) by the standard conductance value of each state to represent the signed integer value in Equation 1. Different from other ternary bit weight mapping methods that use two's complement number representation, this example uses an encoding method, which is a variant of binary coded decimal (BCD) code as the number representation scheme to enable the adaptive quantization algorithm on MMD hardware. That is, in the two-memory device architecture, each differential cell has three states with signed value. Such an encoding method only allows the conductance G of each bit for a single weight to have the same sign to avoid an equivalent representation of the same value. For example, if W=1 and n=2, the conductance state of the two differential pairs can be either ($G_0$, $G_+$) or ($G_+$, $G_-$) since these two combinations can both result in W=1 in Equation 1.

For analog IMC, natural variations in MMD hardware can change the equivalent conductance of each MMD. The analog equivalent weight value $W_A$ can be rewritten as a variation $\Delta G_T$ affected form in Equation 2, in which $\Delta G_T$ and G also are normalized.

$$W_A=\sum_{i=1}^{n} (G_i+\Delta G_T) \times 2^{i-1} G \in (-1, 0, 1) \qquad \text{Equation 2}$$

A multiple-bit input can be converted to a voltage sequence applied to the corresponding location of the respective MMD 280, such as for one bit per cycle to activate the computing in the respective memory cells 286. A partial output can then be summed up with a corresponding bit-shift to get a final mapping result.

The most intensive computation of dot multiplication and addition are computed by multiplying the a-th bit of m weights in the same column $W_A$[a] with the b-th bit of the input IN[b] and the current on each memory cell 286 being automatically summed up, such as by the mapping component 211. Then, the result can be converted into digital values by output circuits and stored in temporary registers. The output value of an input IN multiplied and summed with m weights can be described by Equation 3.

$$\text{Out}=\sum_{b=1}^{n_a} \sum_{a=1}^{n_w} Quant\left(\sum_{i=1}^{m} W_A^i[a] \times IN[b]\right) \times 2^{a+b-2} \qquad \text{Equation 3}$$

As a result of this parameter mapping approach performed by the mapping component 211 employing the MMD 280, the one or more conductance shifts 296 for each MMD 280 can be determined.

It is noted that in one or more embodiments, one or more processes of the mapping component 211 can be performed by the sensing component 212, or vice versa. For example, in one or more embodiments, the sensing component 212 or the mapping component 211 can be omitted or the sensing component 212 and the mapping component 211 can be combined with one another into a combined sensing/mapping component.

Description next turns to a general summary of the conductance shift sensing processes 500 that can be performed by the sensing component 212. For example, the sensing component 212 can generally determine conductance errors 294 of memory cells 286 of a magnetic memory device (MMD) 280 based on a specified state of the MMD 280 and based on sensed conductances 292 of the memory cells 286 at the specified state. This can result in a plurality of known conductance shifts 296 of the MMD 280. In particular, sensing conductance values 292 of the memory cells 286 can comprise the sensing component 212 using suitable equipment with the MMD 280 at a plurality of selected states of the MMD 280, wherein each selected state of the MMD 280 can comprise the memory cells 286 of at least one array of the MMD 280 being set to a same conductance value of −1, 0 or 1. In one or more embodiments, sensed conductance values 292 of the memory cells 286 at a selected state of the MMD 280 can comprise a combination of conductance values 292 of −1, 0 and 1.

Based on the conductance errors 294 and sensed conductances 292, as will be described in detail below relative to FIGS. 5 and 6, the sensing component 212 further can output the sensed respective conductance shifts as the set of known conductance shifts 296. Using the set of known conductance shifts 296, the generating component 214 can generally generate a lookup table 298 comprising the set of known conductance shifts 296 in any suitable form (e.g., text, log, list, chart, matrix, data, metadata, etc.) corresponding to an array of the memory cells 286 of the MMD 280. Finally, the lookup table 298 can be employed to tune the initially calibrated parameters 290 (e.g., for the set of fine-tuning processes 700 of FIG. 7, thus resulting in a set of primarily trained parameters 230.

Turning now to FIG. 5, illustrated is a flow chart further describing the conductance shift sensing processes 500.

First, the target memory device 280 can be set to a state (e.g., −1, 0, 1) upon direction by the sensing component 212 (e.g., step 510). The measurement circuits/equipment employed via the sensing component 212 can sense a conductance value 292 of the state of this MMD 280 (e.g., step 512). The whole array can be set to $G_-$, $G_0$ and $G_+$ to measure the conductance shift 296 of each state. This actively caused memory device variation can cause a conductance shift with a normal distribution centered at the standard conductance $G_{STD}$.

It is noted that sensing accuracy can depend on the conductance shift sensing circuit hardware precision.

The sensed conductance 292 of this MMD 280 can be used to calculate a targeted conductance to calibrate an error 294 caused by the conductance shift in the state of this MMD 280 (e.g., step 514). The conductance shift sensing circuit that is biased properly can sense this distribution, and the digital readout values represent a quantized distribution of the conductance shift. Following, each cell's shifted conductance and state can be obtained. Finally, an equivalent weight represented by multiple cells (bits) can be calculated by Equation 2 and/or by Equation 5.

First, in existing quantization method frameworks, the arbitrary bit quantization of the proposed ternary encoded weights can be given by:

$$Q = \frac{1}{2^n - 1} \times \mathrm{Round}\left((2^n - 1)\left(\frac{\tanh(x)}{\mathrm{Max}(|\tanh(x)|)} + 1\right)\right) - 1 \qquad \text{Equation 5}$$

In Equation 5, x is the real number weight and Q is the n-bit quantized weight. Q will naturally locate in the range [−1,1] with $2^{n+1}-1$ fixed values. Round(x) function takes the nearest integer around x. However, this quantization method only works well for ideal memory devices which is a large deficiency of existing frameworks. That is, as noted above, for analog computing, due to device variations, even without any random cycle to cycle analog noise, the weights represented by device conductance can't be evenly distributed in the given range. Thus, the processes 500 and 700 described herein introduce adaptive quantization to fill a gap between existing quantization frameworks and non-uniform device (e.g., MMD 280) conductance.

At step 5XX, a weight is first calculated to determine which region it is located, using Equation 6.

$$S = \mathrm{Argmin}\left(\frac{w}{\mathrm{Max}(|w|)} - LUT\right) \qquad \text{Equation 6}$$

Here S is the state number of the quantized weight, the weights x are calculated by (6) to determine which state section x drops in.

Then, the real value of the quantized weight is given by checking the equivalent value of the conductance of the corresponding device in the sensed look-up table in Equation 7.

$$G = LUT(S) \qquad \text{Equation 7}$$

A straight-through estimator method can be used in the backpropagation of the dynamic quantization process. When the NN model 250 is deployed for inference, the parameters only record the device state of the corresponding device. The device initiation process can be naturally equivalent to the look-up table matching. Thus, during training, the lookup table checking process is the only step in the dynamic quantization that requires extra data access cost.

Figure 9:
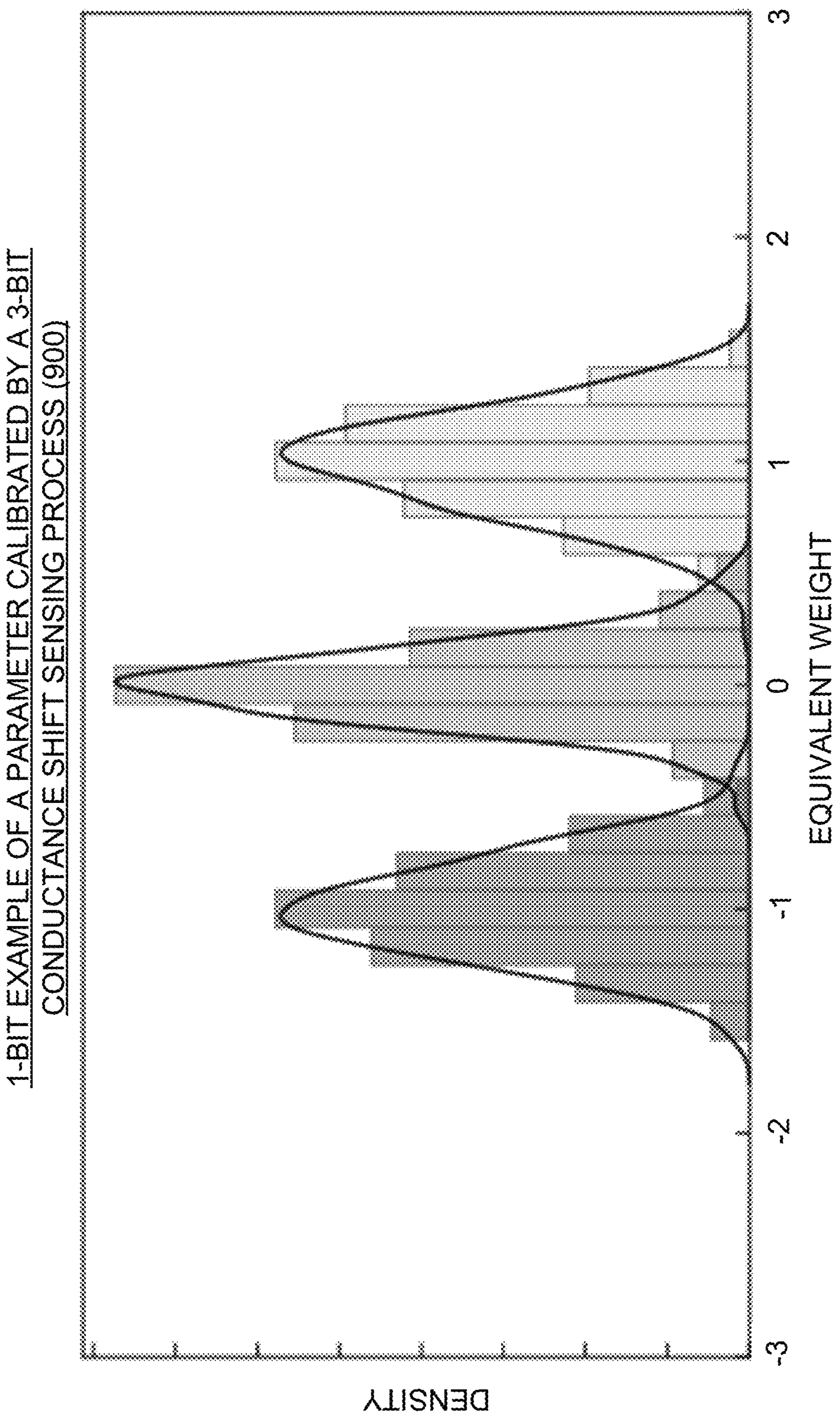
FIG. 9 provides a graphical illustration of a 1-bit example of a parameter calibrated by a 3-bit conductance shift sensing process, as can be performed by the adaptive quantizing system of FIG. 2, in accordance with one or more embodiments described herein.

In connection with the above, FIG. 9 illustrates a 1-bit example of the parameter calibrated by a 3-bit conductance shift sensing process (e.g., graph 900). Instead of the ideal value (−1, 0, 1), the values are calibrated by the conductance shift sensing process with a 3-bit resolution. In this case, the equivalent weight value of each state is 7. The maximum error raised by the device variation of the memory devices is reduced by 7 times.

Figure 10:
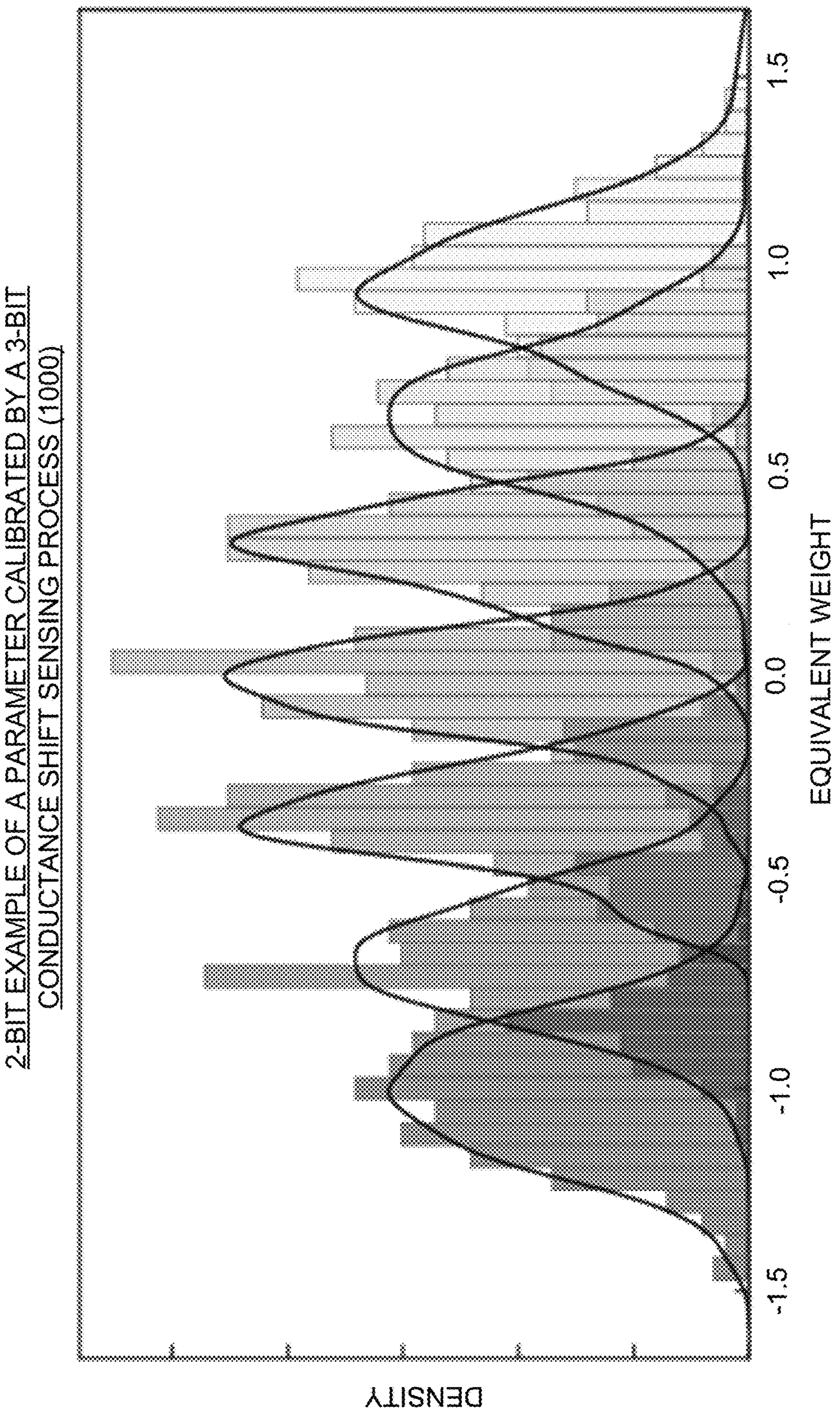
FIG. 10 provides a graphical illustration of a 2-bit example of a parameter calibrated by a 3-bit conductance shift sensing process, as can be performed by the adaptive quantizing system of FIG. 2, in accordance with one or more embodiments described herein.

Also, in connection with the above, FIG. 10 illustrates a 2-bit example of the parameter calibrated by a 3-bit conductance shift sensing process (e.g., graph 1000). Instead of the ideal value [−1,1], with 7 values, the values are calibrated by the conductance shift sensing process with a 3-bit resolution. The conductance shift sensing process 500 (e.g., the sensing component 212) identifies an overlap between nearby values. Thus, a parameter 288 mapped to this memory device 280 can have a significantly lower mapping error.

Finally, an output of the conductance shift sensing circuit can be written as Equation 4.

$$\Delta G = Quant(\Delta G_{real}) \qquad \text{Equation 4}$$

Here, ΔG is the digital value of the conductance shift given by the conductance shift sensing circuit output. The quantization error caused by conductance shift sensing circuit can contribute to error in the digital domain. Theoretically, more accurate sensing circuits can provide higher resolutions and/or can have fewer errors.

The calibrated conductance of the respective MMD 280 can be recorded in the device-specific conductance shift lookup table 298 (e.g., step 516).

This sensing flow can iterate several times (e.g., step 518) until all the states of this memory device 280 and/or all the memory devices 280 in an IMC system are calibrated using the conductance shift sensing processes 500. For example, the sensing component 212 can determine at decision step 517 if there is another state at which to set the MMD 280 to (e.g., a state at which the MMD 280 has not previously been set for completion of the above steps 512-516). If yes, the processes 500 can proceed along step 518 for further iteration. If no, the processes 500 can stop at step 518.

That is, after all array rows are sensed, a device-specific conductance shift lookup table (DSCS-LUT) as shown in Table 1 can be obtained for each IMC system.

TABLE 1

| | Output Conductance | | Sensed | Sensed | Calibrated |
|---|---|---|---|---|---|
| State | On chip | Standard | shift | conductance | Value |
| 1 | 60 μS | 100 μS | −33.3 μS | 66.7 μS | 0.667 |
| 0 | −12 μS | 0 μS | 0 μS | 0 μS | 0 |
| −1 | −132.2 μS | −100 μS | −33.3 μS | −133.3 μS | 1.333 |

Next, FIG. 6 provides a graph 600 of the conductance shift in a set of memory devices 280. For a particular state, the targeted conductance can be considered the ideal value and the reference for the sensing circuits. The non-idealities of the memory devices can result in different conductances between the different devices. Therefore, the conductance shift process 500 aims to measure the non-idealities of each memory device. The conductance shift is illustrated in percentage at graph 600, but also can be illustrated in absolute conductance values and/or in conductance differences. A logistic regression at graph 600 demonstrates that this conductance shift follows a Gaussian distribution. The strength of the variation between devices can be related to the fabrication technique and device properties.

Figure 8:
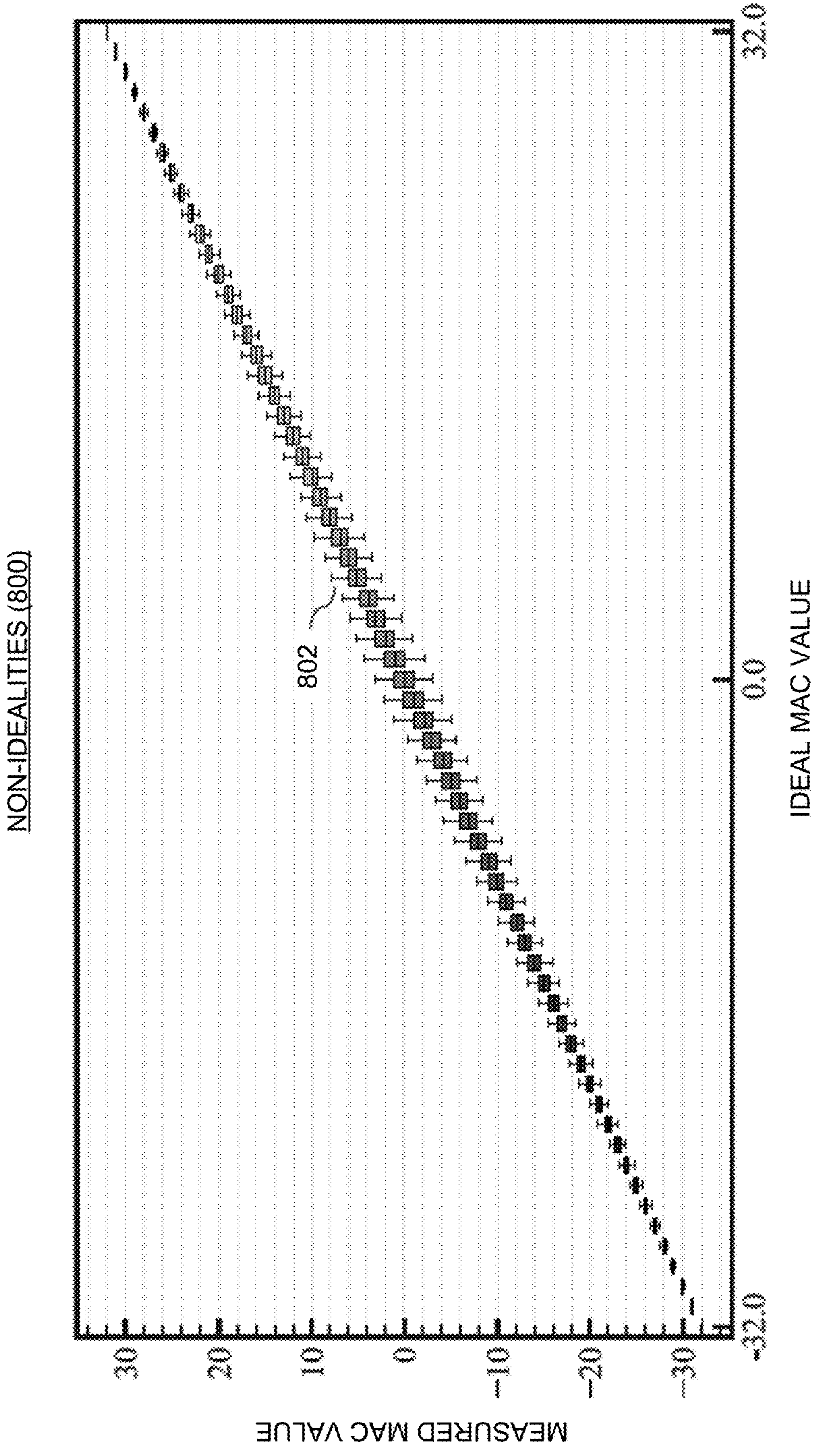
FIG. 8 provides a graphical illustration of non-idealities in correspondence with FIG. 7, in accordance with one or more embodiments described herein.

Turning next first to FIG. 3, and then to FIGS. 7 and 8, the pre-trained NN model 250/initially calibrated parameters 290 can next be fine-tuned by adaptive quantization combined with the chip-specific conductance shifts 296 and lookup table 298 output from the conductance shift sensing processes 500.

Description first turns to a general summary of the fine-tuning processes 700. For example, the tuning component 216 (FIG. 2) can employ the lookup table 298 and can tune a plurality of initially calibrated parameters 290 of a neural network model 250. The tuning by the tuning component 216 can comprise mapping the plurality of initially calibrated parameters 290 to the memory cells 286 using the plurality of known conductance shifts 296 of the MMD 280 at the lookup table 298, resulting in a set of primarily trained parameters 230.

FIG. 3 represents this fine-tuning process as a portion of the iterative training 310. At FIG. 3, an IMC output 354 can be the known conductance shifts 296. Using the known conductance shifts 296, the tuning component 216 can perform tuning 320.

That is, next, FIG. 7 provides a flow chart of the adaptive quantization fine-tuning process 700. In this stage, the NN model 250 has already converged at a local minimum that provides a good noise tolerance with decent accuracy. Therefore, only a few epochs can be needed to re-quantize and optimize the NN model 250 for the specific devices. While existing methods can be used to fill in the accuracy gap between low-bit quantized networks and full-precision networks, the low-bit parameters are naturally in a lower dimension space that provides less ability to fit the training data. The adaptive quantization fine-tuning process 700 described herein quantizes the values unevenly, which increases the complexity of the quantized parameter space and can potentially increase the performance of DNN models despite merely recovering the accuracy loss caused by variations.

At step 710, the pre-trained model parameters (e.g., initially calibrated parameters 290) can be loaded for fine-tuning. That is, the pre-trained NN model 250 can be first added with hardware non-idealities (step 712). Then, at step 714, the initially calibrated parameters 290 can be adaptively quantized according to the device-specific conductance shift lookup table 298. The calibrated parameters can be used for forward calculations at step 718. The NN model 250's output can be used to calculate the training error, and the error can backpropagated to update the parameters at step 720 (e.g., parameter update 322).

This fine-tuning portion of the iterative training process 310 can iterate for several cycles, such as until the error is decreased to a targeted value and/or until a maximum training cycle is achieved. For example, one or more of these factors can be evaluated at decision step 721 by the tuning component 216.

Next, FIG. 8 provides a graph 800 illustrating a respective MMD's non-idealities that are mentioned in FIG. 7. The x-axis is the ideal MAC value, which is obtained by randomly combining the input and parameter in the memory devices to achieve this MAC value. The y-axis is the measured MAC value that can be obtained by measuring the output of the IMC system. Due to non-idealities in the IMC system and variations of the MMDs 280, the measured output is not the same as the ideal values. In this case, the measured MAC value can show a distribution 802 as illustrated at FIG. 8. Overlaps between nearby MAC values can result in computational errors because they will mix up and cause fault-sensing for the output circuits.

Turning again to FIG. 2, the updating component 218, in one or more embodiments, can direct further iterative training of the set of primarily trained parameters, based on the fine-tuning processes 217 output using the tuning component 216, comprising employing backpropagation using determined errors to update the plurality of primarily trained parameters, resulting in a plurality of intermediately calibrated parameters 232. Additionally, and/or alternatively, in one or more embodiments, the updating component 218 can direct further iterative training of the plurality of intermediately calibrated parameters 232, using the plurality of known conductance shifts 296, resulting in a set of secondarily trained parameters 234. In one or more cases, these additional iterative processes can be performed using a decision step 358 performed by the updating component 218, such as based on a specified re-iteration frequency and/or based on direction by a user entity using a computer device communicatively coupled to the non-limiting system 200.

Turning still to FIG. 2 and also to FIG. 3, the executing component 220 can direct operation of the MMD 280 (e.g., execution of IMC 350) using input data (e.g., MMD input data 248 also referred to as IMC input 248 at FIG. 3) for an on-chip inference at the MMD 280, resulting in output data 249 (e.g., MMD output data 249 also referred to as IMC output 249 at FIG. 3). The on-chip inference solely relies on the trained data. Thus, no further on-chip writing cycle is needed once the parameters are stored in the memory devices 280. The output data 249 is generally based on the plurality of known conductance shifts 296 of the memory cells 286 of the MMD 280 and that employs the plurality of secondarily trained parameters 234 or primarily trained parameters 230 having been quantized at the MMD 280.

In one or more embodiments, the MMD output data 249 can be employed as NN input data 251 and/or can be converted to NN input data 251 (e.g., converted into a form commensurate with application by the NN model 250). Neural network output data 252, resulting from employing the plurality of secondarily trained parameters 234 or primarily trained parameters 230 having been quantized at the MMD 280, has a higher level of accuracy than other neural network output data resulting from employing only the original parameters 287/quantized parameters 288 at the neural network.

Indeed, an exemplary experimental result is shown in the Table 2. Relative to Table 2, the output inference accuracy can be based on the converted input and stored parameters on the IMC systems. The accuracy of a raw model that is not optimized by any method can be significantly affected by the noise strength of the memory devices in the IMC systems. By applying the iterative training processes 310 discussed herein, the NN model 250 can be made more robust than a raw model NN model 240. The resulting fine-tuned NN model 250 can further increase the inference accuracy significantly. That is, in one or more embodiments, accuracy loss can be reduced to an acceptable value by applying the adaptive quantization.

TABLE 2

| Noise Strength | Raw Model | Pre-trained Model | Fine-tuned Model |
|---|---|---|---|
| 0% | 91.73% | 90.39% | 91.11% |
| 5% | 86.64% | 89.65% | 90.73% |
| 10% | 51.29% | 88.11% | 90.60% |
| 15% | 12.66% | 84.38% | 90.01% |
| 20% | 10.29% | 77.63% | 88.38% |

Example Methods of Use

Figure 11:
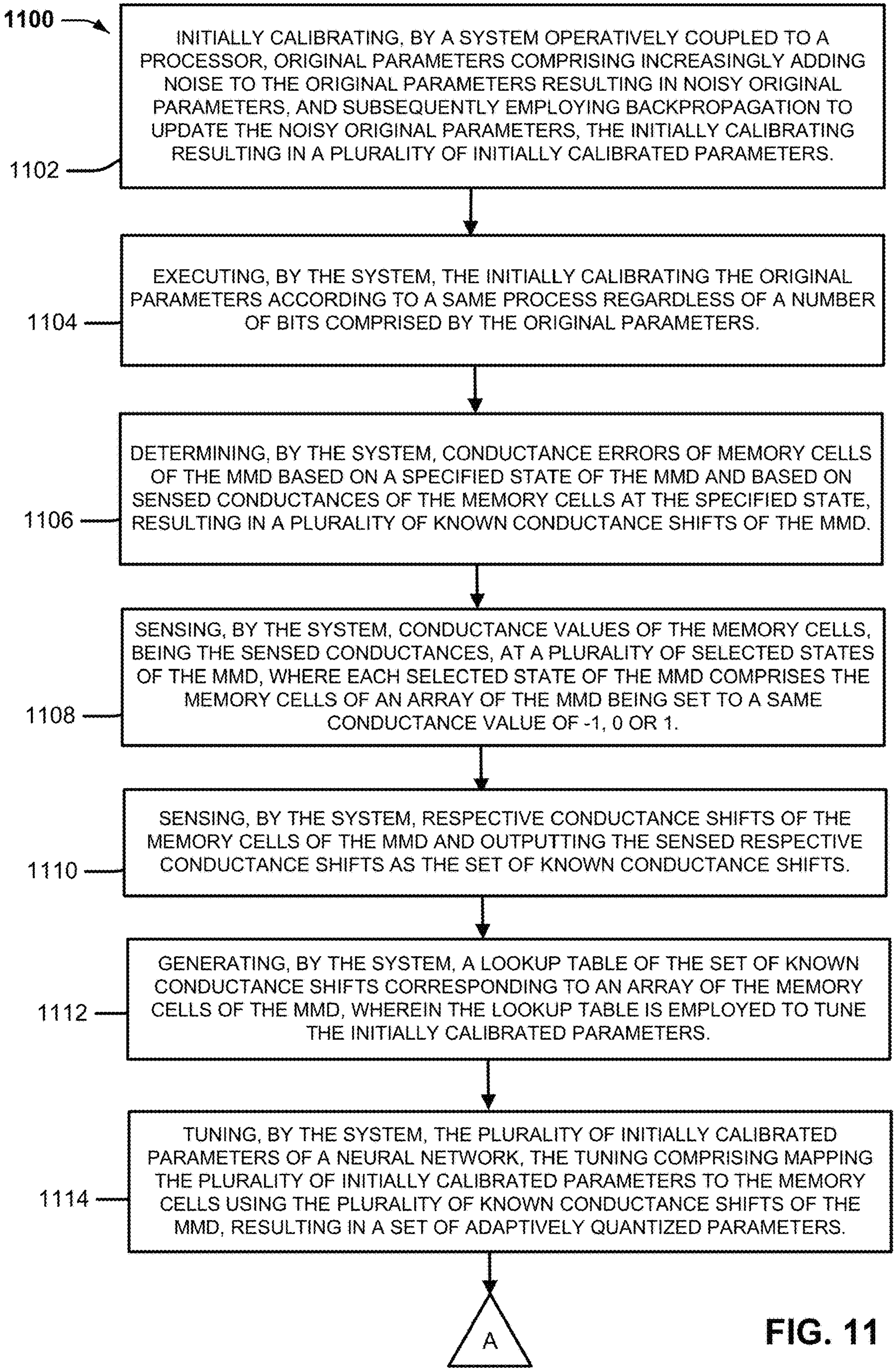
FIG. 11 illustrates still a process flow of a method of use of the adaptive quantizing system of FIG. 2, in accordance with one or more embodiments described herein.
Figure 12:
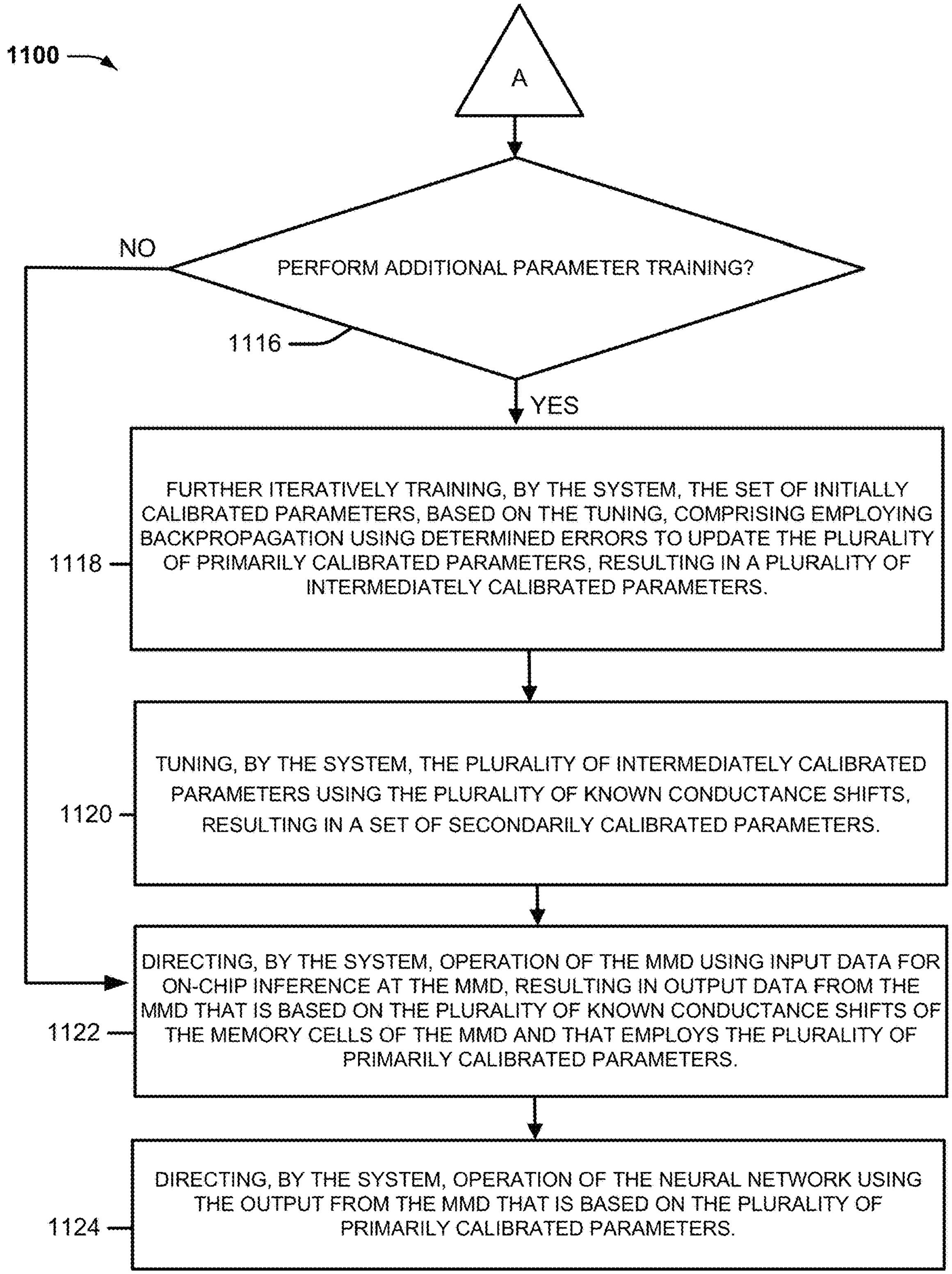
FIG. 12 illustrates a continuation of the process flow of FIG. 11 of a method of use of the adaptive quantizing system of FIG. 2, in accordance with one or more embodiments described herein.

Turning now to FIGS. 11 and 12, illustrated is a flow diagram of an example, non-limiting method 1100 that can facilitate a process to adapt and perform in-memory computing. Repetitive description of like elements and/or processes employed in respective embodiments is omitted for sake of brevity.

Looking first to operation 1102 at FIG. 11, the non-limiting method 1100 can comprise initially calibrating, by a system operatively coupled to a processor (calibrating component 210), original parameters (e.g., original parameters 287) comprising increasingly adding noise to the original parameters resulting in noisy original parameters, and subsequently employing backpropagation to update the noisy original parameters, the initially calibrating resulting in a plurality of initially calibrated parameters (e.g., initially calibrated parameters 290).

At operation 1104, the non-limiting method 1100 can comprise executing, by the system (e.g., calibrating component 210), the initially calibrating the original parameters according to a same process regardless of a number of bits comprised by the original parameters.

At operation 1106 the non-limiting method 1100 can comprise determining, by the system (e.g., sensing component 212), conductance errors (e.g., conductance errors 294) of memory cells (e.g., memory cells 286) of the MMD based on a specified state of the MMD and based on sensed conductances (e.g., sensed conductances 293) of the memory cells at the specified state, resulting in a plurality of known conductance shifts (e.g., conductance shifts 296) of the MMD.

At operation 1108, the determining (operation 1106) of the non-limiting method 1100 can comprise sensing, by the system (e.g., sensing component 212), conductance values of the memory cells, being the sensed conductances, at a plurality of selected states of the MMD, wherein each selected state of the MMD comprises the memory cells of an array of the MMD being set to a same conductance value of −1, 0 or 1.

In one or more embodiments, conductance values of the memory cells at a selected state of the MMD comprise a combination of conductance values of −1, 0 and 1 of the memory cells.

At operation 1110, the determining (operation 1106) of the non-limiting method 1100 can comprise sensing, by the system (e.g., sensing component 212), respective conductance shifts of the memory cells of the MMD and outputting the sensed respective conductance shifts as the set of known conductance shifts.

At operation 1112, the non-limiting method 1100 can comprise generating, by the system (e.g., generating component 214), a lookup table (e.g., lookup table 298) of the set of known conductance shifts corresponding to an array of the memory cells of the MMD, wherein the lookup table is employed to tune the initially calibrated parameters.

At operation 1114, the non-limiting method 1100 can comprise tuning, by the system (e.g., tuning component 216), the plurality of initially calibrated parameters of a neural network (e.g., neural network model 250), the tuning comprising mapping the plurality of initially calibrated parameters to the memory cells using the plurality of known conductance shifts of the MMD, resulting in a set of primarily trained parameters (e.g., primarily trained parameters 230).

At operation 1116, the non-limiting method 1100 can comprise determining, by the system (e.g., updating component 218), whether to perform additional parameter training comprising further calibrating of the set of primarily trained parameters and subsequent tuning of a result of the further calibrating. If yes, the non-limiting method 1100 can proceed to operation 1118. If no, the non-limiting method 1100 can proceed to operation 1122 using the primarily trained parameters.

At operation 1118, the non-limiting method 1100 can comprise further iteratively training, by the system (e.g., updating component 218), the set of primarily trained parameters, based on the tuning, comprising employing backpropagation (e.g., backward pass 318) using determined errors (e.g., errors 316) to update the plurality of primarily trained parameters, resulting in a plurality of intermediately calibrated parameters (e.g., intermediately calibrated parameters 232).

At operation 1120, the non-limiting method 1100 can comprise tuning, by the system, the plurality of intermediately calibrated parameters using the plurality of known conductance shifts, resulting in a set of secondarily trained parameters (e.g., secondarily trained parameters 234).

At operation 1122, the non-limiting method 1100 can comprise directing, by the system (e.g., executing component 220), operation of the MMD using input data for on-chip inference at the MMD, resulting in output data from the MMD that is based on the plurality of known conductance shifts of the memory cells of the MMD and that employs the plurality of secondarily trained parameters.

At operation 1124, the non-limiting method 1100 can comprise directing, by the system (e.g., executing component 220), operation of the neural network using the output from the MMD that is based on the plurality of primarily trained parameters.

In one or more embodiments, neural network output data (e.g., neural network output data 252), resulting from employing the plurality of secondarily trained parameters at a neural network, has a higher level of accuracy than other neural network output data, resulting from employing original non-trained parameters at the neural network.

Figure 13:
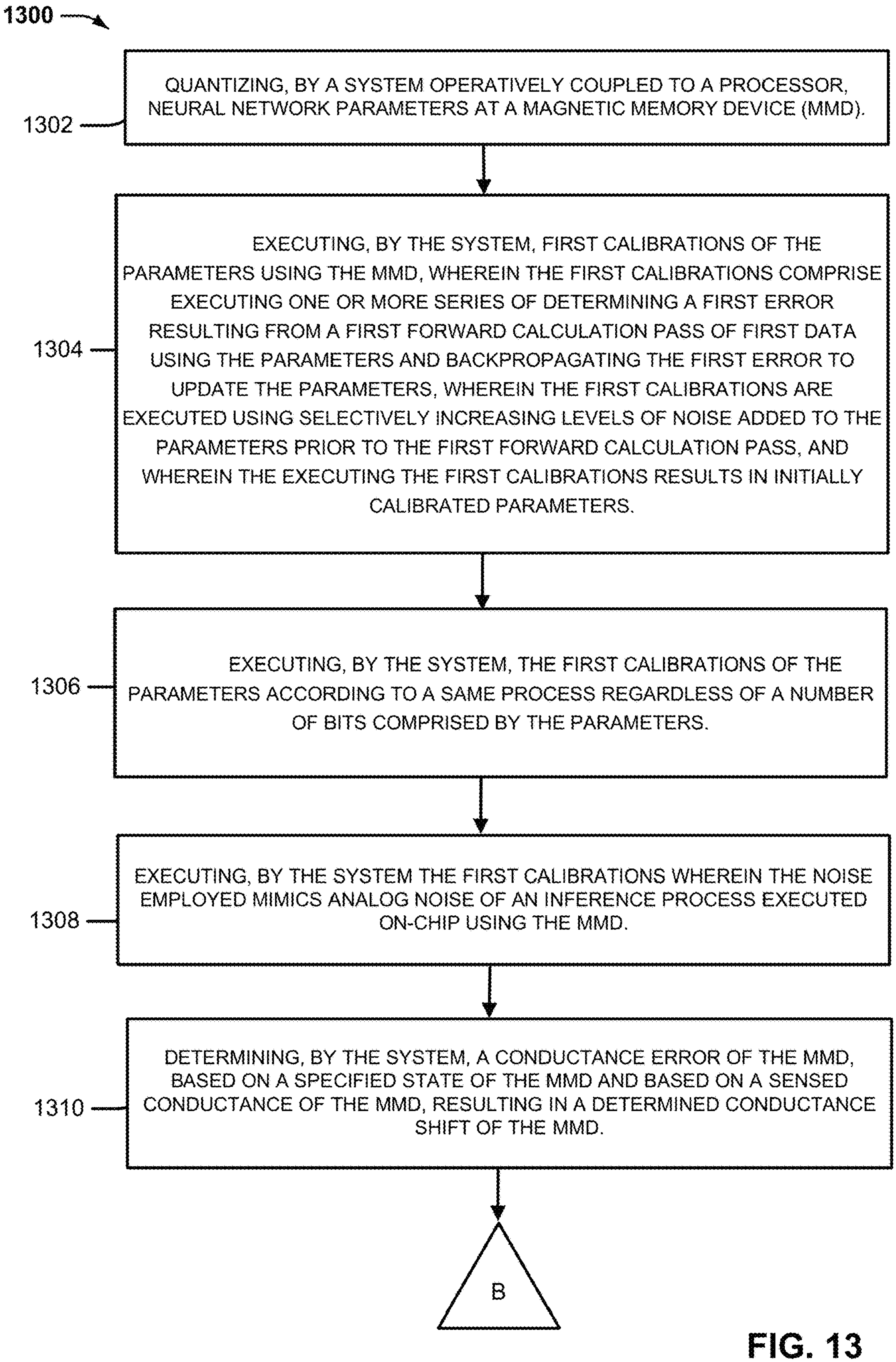
FIG. 13 illustrates another process flow of a method of use of the adaptive quantizing system of FIG. 2, in accordance with one or more embodiments described herein.
Figure 14:
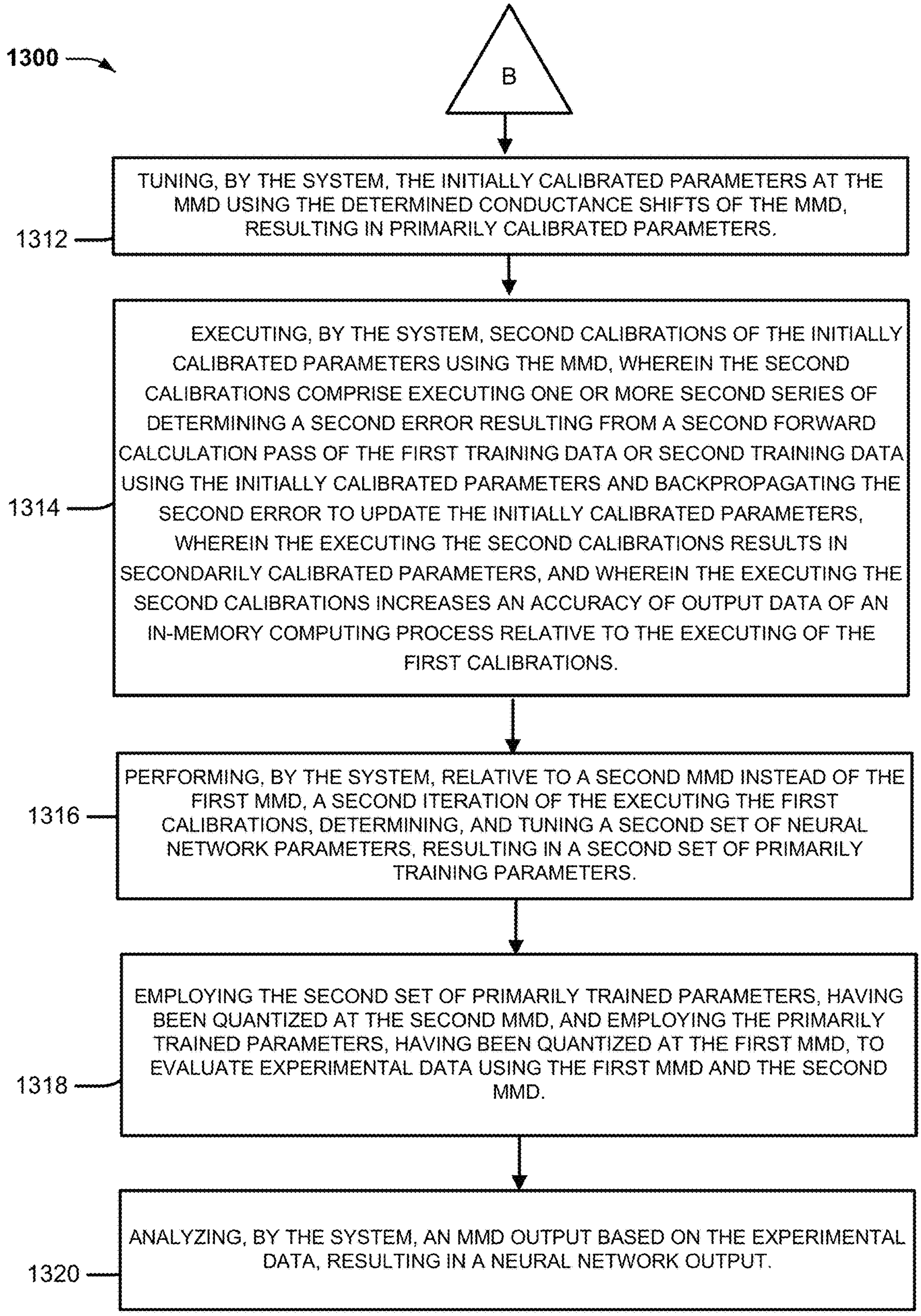
FIG. 14 illustrates a continuation of the process flow of FIG. 13 of a method of use of the adaptive quantizing system of FIG. 2, in accordance with one or more embodiments described herein.

Turning now to FIGS. 13 and 14, illustrated is a flow diagram of another example, non-limiting method 1300 that can facilitate a process to adapt and perform in-memory computing. Repetitive description of like elements and/or processes employed in respective embodiments is omitted for sake of brevity.

Looking first to operation 1302 at FIG. 13, the non-limiting method 1300 can comprise quantizing, by a system operatively coupled to a processor (e.g., tuning component 216), neural network parameters (e.g., of NN MODEL 250) at a magnetic memory device (MMD) (e.g., MMD 280).

At operation 1304, the non-limiting method 1300 can comprise executing, by a system operatively coupled to a processor (calibrating component 210), first calibrations of the parameters using the MMD, wherein the first calibrations comprise executing one or more series of determining a first error (e.g., error 316) resulting from a first forward calculation pass (e.g., forward pass 312) of first data using the parameters and backpropagating (e.g., backward pass 318) the first error to update the parameters, wherein the first calibrations are executed using selectively increasing levels of noise added to the parameters prior to the first forward calculation pass, and wherein the executing the first calibrations results in initially calibrated parameters (e.g., initially calibrated parameters 290).

At operation 1306, the non-limiting method 1300 can comprise executing, by the system (e.g., calibrating component 210), the first calibrations of the parameters according to a same process regardless of a number of bits comprised by the parameters.

At operation 1308, the non-limiting method 1300 can comprise executing, by the system the first calibrations wherein the noise employed mimics analog noise of an inference process executed on-chip using the MMD.

At operation 1310, the non-limiting method 1300 can comprise determining, by the system (e.g., sensing component 212), a conductance error (e.g., conductance error 294) of the MMD, based on a specified state of the MMD and based on a sensed conductance (e.g., sensed conductance 292) of the MMD, resulting in a determined conductance shift (e.g., conductance shift 296) of the MMD.

At operation 1312, the non-limiting method 1300 can comprise tuning, by the system (e.g., tuning component 216), the initially calibrated parameters using the determined conductance shifts of the MMD, resulting in primarily trained parameters (e.g., primarily trained parameters 230).

At operation 1314, the non-limiting method 1300 can comprise executing, by the system (e.g., updating component 218 and/or calibrating component 210), second calibrations of the initially calibrated parameters using the MMD, wherein the second calibrations comprise executing one or more second series of determining a second error resulting from a second forward calculation pass of the first training data or second training data using the initially calibrated parameters and backpropagating the second error to update the initially calibrated parameters, wherein the executing the second calibrations results in secondarily trained parameters, and wherein the executing the second calibrations increases an accuracy of output data of an in-memory computing process relative to the executing of the first calibrations.

At operation 1316, the non-limiting method 1300 can comprise performing, by the system (e.g., calibrating component 210 and tuning component 216), relative to a second MMD instead of the first MMD, a second iteration of the executing the first calibrations, determining, and tuning a second set of neural network parameters, resulting in a second set of primarily training parameters.

At operation 1318, the non-limiting method 1300 can comprise employing, by the system, (executing component 220) the second set of primarily trained parameters, having been quantized at the second MMD, and employing the primarily trained parameters, having been quantized at the first MMD, to evaluate experimental data using the first MMD and the second MMD.

At operation 1320, the non-limiting method 1300 can comprise analyzing, by the system (e.g., neural network model 250), an MMD output (e.g., MMD output data 249) based on the experimental data, resulting in a neural network output (e.g., NN output data 252).

Figure 15:
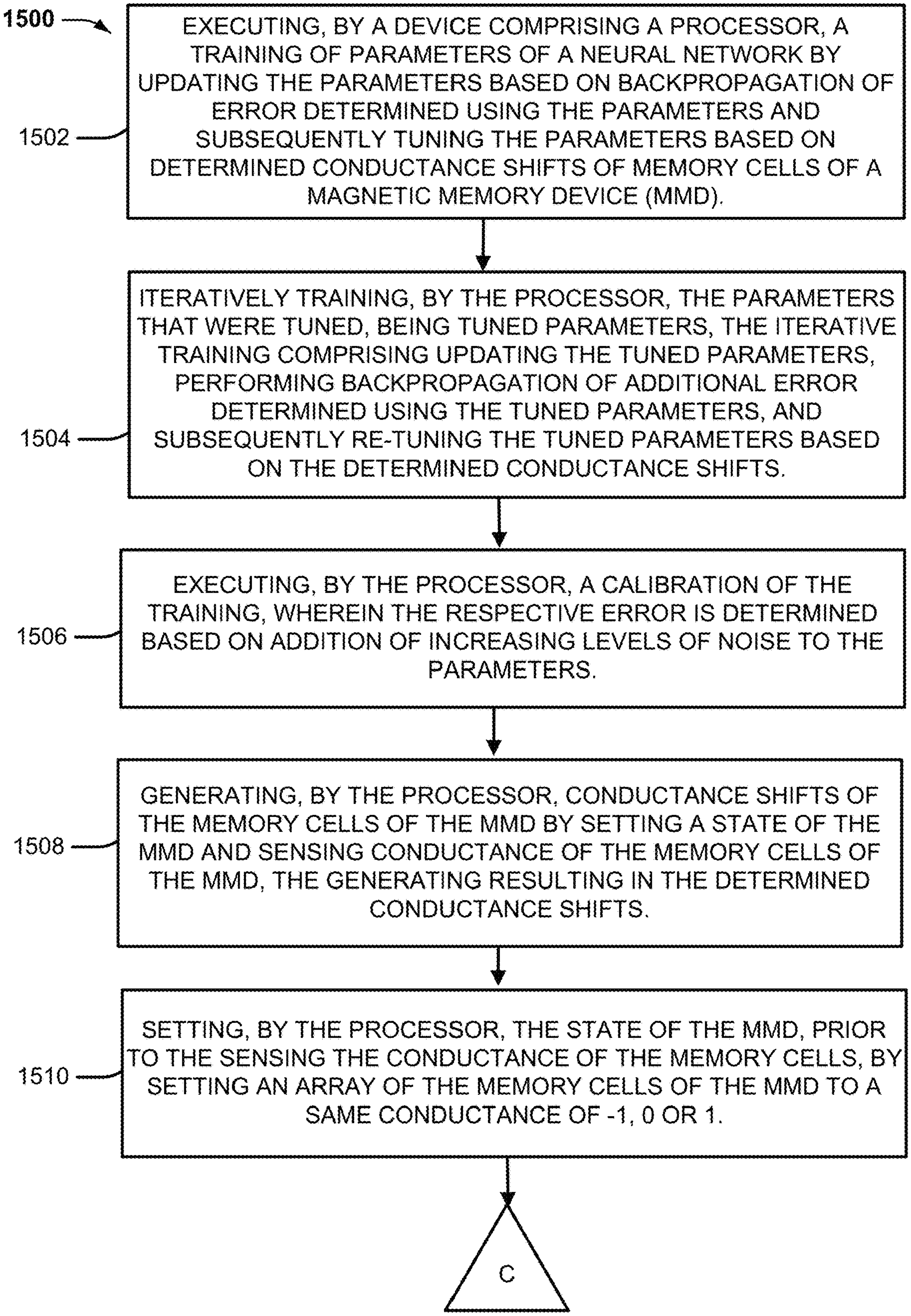
FIG. 15 illustrates still another process flow of a method of use of the adaptive quantizing system of FIG. 2, in accordance with one or more embodiments described herein.
Figure 16:
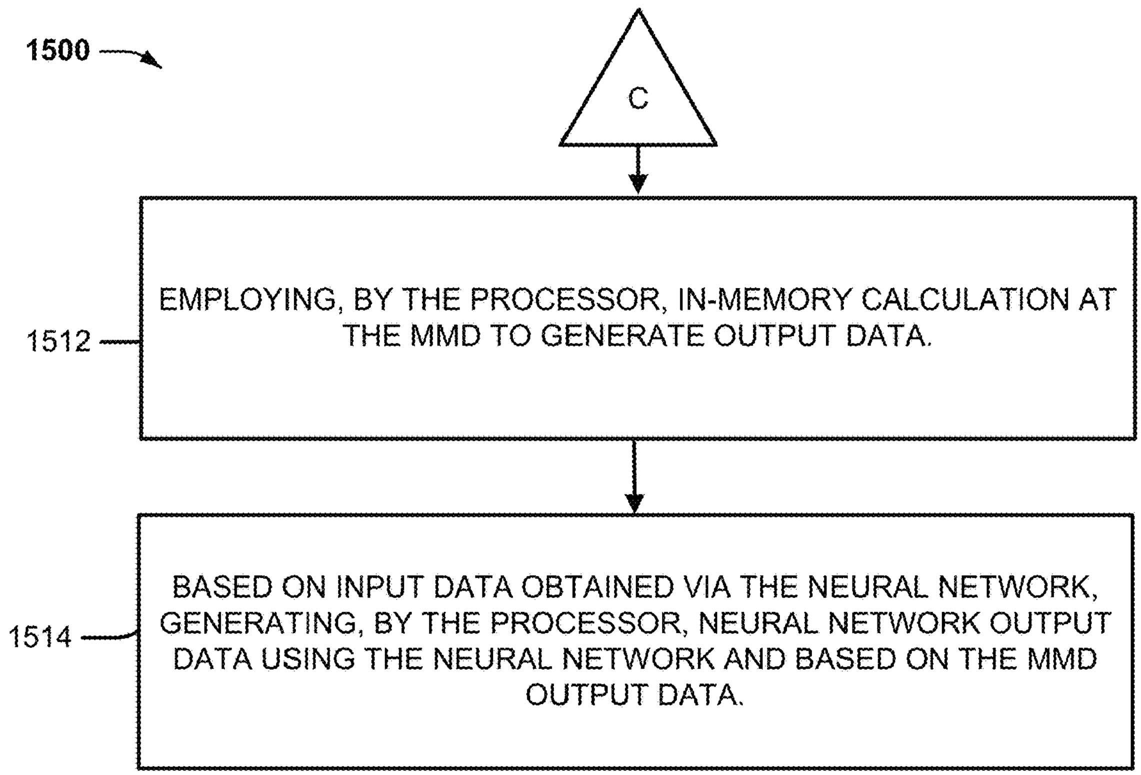
FIG. 16 illustrates a continuation of the process flow of FIG. 15 of a method of use of the adaptive quantizing system of FIG. 2, in accordance with one or more embodiments described herein.

Turning now to FIGS. 15 and 16, illustrated is a flow diagram of another example, non-limiting method 1500 that can facilitate a process to adapt and perform in-memory computing. Repetitive description of like elements and/or processes employed in respective embodiments is omitted for sake of brevity.

Looking first to operation 1502 at FIG. 15, the non-limiting method 1500 can comprise executing, by a device comprising a processor (e.g., processor 206), a training of parameters (e.g., original parameters 287) of a neural network (e.g., neural network model 250) by updating the parameters based on backpropagation of error determined using the parameters and subsequently tuning the parameters based on determined conductance shifts (e.g., conductance shifts 296) of memory cells (e.g., memory cells 286) of a magnetic memory device (MMD) (e.g., MMD 280).

At operation 1504, the non-limiting method 1500 can comprise iteratively training, by the processor, the parameters that were tuned, being tuned parameters, the iterative training comprising updating the tuned parameters, performing backpropagation of additional error determined using the tuned parameters, and subsequently re-tuning the tuned parameters based on the determined conductance shifts.

At operation 1506, the non-limiting method 1500 can comprise executing, by the processor, a calibration of the training, wherein the respective error is determined based on addition of increasing levels of noise to the parameters.

At operation 1508, the non-limiting method 1500 can comprise generating, by the processor, conductance shifts of the memory cells of the MMD by setting a state of the MMD and sensing conductance of the memory cells of the MMD, the generating resulting in the determined conductance shifts.

At operation 1510, the non-limiting method 1500 can comprise setting, by the processor, the state of the MMD, prior to the sensing the conductance of the memory cells, by setting an array of the memory cells of the MMD to a same conductance of −1, 0 or 1.

At operation 1512, the non-limiting method 1500 can comprise employing, by the processor, in-memory calculation at the MMD to generate output data (e.g., MMD output data 249).

At operation 1514, the non-limiting method 1500 can comprise, based on input data (e.g., NN input data 251) obtained via the neural network, generating, by the processor, neural network output data (e.g., NN output data 252) using the neural network and based on the MMD output data.

SUMMARY

In summary, one or more systems, methods and/or machine-readable mediums are described herein for adaptively quantizing the parameters that are aimed to be deployed on in-memory computing systems based on magnetic memory devices. The method includes quantizing parameters based on a conductance shift sensing process, a sensed conductance shift value, a conductance shift lookup table, and a parameter to be quantized. The parameter can be quantized by using a value recorded in the lookup table, such as rounding to the nearest value. The lookup table can be generated by the conductance shift sensing process which can enabling recording of a sensed conductance of a magnetic memory device and an associated device state. The conductance shift sensing process can set the magnetic memory device (MMD) to different states and can measure the conductance shift of the MMD, caused by the state setting, using suitable equipment.

A benefit of the aforementioned system, non-transitory machine-readable medium, and/or computer-implemented method can be an ability to employ less hardware, as compared to existing frameworks, to support the performance and throughput specifications, such as service level agreements (SLAs). That is, by employing an adaptive quantization method described herein, better data center consolidation, reduced capital costs, and/or reduced operational and/or infrastructure overhead can be obtained. In connection therewith, a lifetime of existing hardware and software can be increased by enabling increased performance using currently employed hardware with the one or more embodiments described herein for adaptive quantization-based IMC.

Furthermore, as compared to existing IMC approaches, the one or more embodiments described herein can provide for more accurate output and/or reduced (multiply and accumulation) MAC error in an analog IMC system.

Another benefit of the aforementioned system, non-transitory machine-readable medium, and/or computer-implemented method can be an ability to greatly reduce the multiplication and accumulation (MAC) in analog in-memory computing systems. In one or more cases, a deep neuron network model optimized by this method can maintain high accuracy under significant memory device variations and circuit noise.

Indeed, a practical application of the systems, computer-implemented methods, and/or computer program products described herein can be use of a framework described herein to measure conductances at memory cells of a memory device and to update parameter data stored at the memory cells based on the measured conductances. As a result, use of the memory cells for an in-memory computing operation can be optimized based at least on the measurement of the conductances. Overall, such computerized tools can constitute a concrete and tangible technical improvement in the various fields using IMC, e.g., neural network use, without being limited thereto.

One or more embodiments described herein can be inherently and/or inextricably tied to computer technology and cannot be implemented outside of a computing environment. For example, one or more processes performed by one or more embodiments described herein can more efficiently, and even more feasibly, provide program and/or program instruction execution, such as relative to operation of in-memory computing, as compared to existing systems and/or techniques lacking such approach(es). Systems, computer-implemented methods, and/or computer program products enabling performance of these processes are of great utility in the various fields using IMC, e.g., neural network use, without being limited thereto, and cannot be equally practicably implemented in a sensible way outside of a computing environment. Indeed, IMC itself is and/or involves use of data stored at memory cells of a memory device, and the one or more adaptive quantization processes described herein involve operation of an MMD and measurement of conductances output by the MMD.

One or more embodiments described herein can employ hardware and/or software to solve problems that are highly technical, that are not abstract, and that cannot be performed as a set of mental acts by a human. For example, a human, or even thousands of humans, cannot efficiently, accurately, and/or effectively electronically operate and measure conductances at an MMD, or operate an MMD for IMC, as the one or more embodiments described herein can provide this process. And, neither can the human mind nor a human with pen and paper electronically effectively electronically achieve, provide and/or execute such processes, as conducted by one or more embodiments described herein.

In one or more embodiments, one or more of the processes and/or frameworks described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, cloud computing systems, computer architecture, and/or another technology.

One or more embodiments described herein can be fully operational towards performing one or more other functions (e.g., fully powered on, fully executed and/or another function) while also performing one or more of the one or more operations described herein.

To provide additional summary, a listing of embodiments and features thereof is next provided.

A system, comprising: at least one memory that stores computer executable components; and at least one processor that executes the computer executable components stored in the at least one memory to perform operations comprising: determining conductance errors of memory cells of a magnetic memory device (MMD) based on a specified state of the MMD and based on sensed conductances of the memory cells at the specified state, resulting in a plurality of known conductance shifts of the MMD; and tuning a plurality of initially calibrated parameters of a neural network, the tuning comprising mapping the plurality of initially calibrated parameters to the memory cells using the plurality of known conductance shifts of the MMD, resulting in a set of primarily trained parameters.

The system of the preceding paragraph, wherein determining the known conductance shifts of the MMD comprises: sensing respective conductance shifts of the memory cells of the MMD and outputting the sensed respective conductance shifts as the set of known conductance shifts; and generating a lookup table of the set of known conductance shifts corresponding to an array of the memory cells of the MMD, wherein the lookup table is employed to tune the initially calibrated parameters.

The system of any preceding paragraph, wherein determining the known conductance shifts of the MMD comprises: sensing conductance values of the memory cells, being the sensed conductances, at a plurality of selected states of the MMD, wherein each selected state of the MMD comprises the memory cells of an array of the MMD being set to a same conductance value of −1, 0 or 1.

The system of any preceding paragraph, wherein conductance values of the memory cells at a selected state of the MMD comprise a combination of conductance values of −1, 0 and 1 of the memory cells.

The system of any preceding paragraph, wherein the operations further comprise: initially calibrating original parameters comprising increasingly adding noise to the original parameters, resulting in noisy original parameters, and subsequently employing backpropagation to update the noisy original parameters, the initially calibrating resulting in the plurality of initially calibrated parameters.

The system of any preceding paragraph, wherein the initially calibrating the original parameters is executed according to a same process regardless of a number of bits comprised by the original parameters.

The system of any preceding paragraph, wherein the operations further comprise: further iteratively training the set of primarily trained parameters, based on the tuning, comprising employing backpropagation using determined errors to update the plurality of primarily trained parameters, resulting in a plurality of intermediately calibrated parameters.

The system of any preceding paragraph, wherein the operations further comprise: further iteratively training the plurality of intermediately calibrated parameters, using the plurality of known conductance shifts, resulting in a set of secondarily trained parameters.

The system of any preceding paragraph, wherein the operations further comprise: directing operation of the MMD using input data for an on-chip inference at the MMD, resulting in output data that is based on the plurality of known conductance shifts of the memory cells of the MMD and that employs the plurality of primarily trained parameters.

The system of any preceding paragraph, wherein neural network output data, resulting from employing the plurality of secondarily trained parameters at a neural network, has a higher level of accuracy than other neural network output data resulting from employing the primarily trained parameters at the neural network.

A method, comprising: quantizing neural network parameters at a magnetic memory device (MMD); executing first calibrations of the parameters, wherein the first calibrations comprise determining a first error resulting from a first forward calculation pass of first data using the parameters and backpropagating the first error to update the parameters, wherein the first calibrations are executed using selectively increasing levels of noise added to the parameters prior to the first forward calculation pass, and wherein the executing the first calibrations results in initially calibrated parameters; determining a conductance error of the MMD, based on a specified state of the MMD and based on a sensed conductance of the MMD, resulting in a determined conductance shift of the MMD; and tuning the initially calibrated parameters using the determined conductance shifts of the MMD, resulting in primarily trained parameters.

The method of the preceding paragraph, further comprising: executing iterative training of the primarily trained parameters, wherein the iterative training comprises executing one or more series of calibrating and tuning processes comprising: determining a second error resulting from a second forward calculation pass corresponding to the primarily trained parameters, backpropagating the second error to update the primarily trained parameters, wherein the executing the second calibrations results in intermediately calibrated parameters, and tuning the intermediately calibrated parameters using the determined conductance shift, resulting in secondarily trained parameters, wherein the executing the iterative training increases an accuracy of output data of an in-memory computing process using the secondarily trained parameters relative to the executing of the first calibrations.

The method of any preceding paragraph, wherein the executing the first calibrations of the parameters using the MMD is performed according to a same process regardless of a number of bits comprised by parameters.

The method of any preceding paragraph, wherein the noise employed mimics analog noise of an inference process executed on-chip using the MMD.

The method of any preceding paragraph, wherein the MMD is a first MMD, and further comprising: performing, relative to a second MMD instead of the first MMD, a second iteration of the executing the first calibrations, determining, and tuning a second set of neural network parameters, resulting in a second set of primarily training parameters; employing the second set of primarily trained parameters, having been quantized at the second MMD, and employing the primarily trained parameters, having been quantized at the first MMD, to evaluate experimental data using the first MMD and the second MMD.

The method of any preceding paragraph, wherein the experimental data comprises analog data or digital data, wherein the experimental data is output from a neural network, and wherein an MMD output based on the experimental data is analyzed by the neural network resulting in a neural network output.

A non-transitory machine-readable medium, comprising executable instructions that, when executed by at least one processor, facilitate performance of operations, comprising: based on input data obtained via a neural network, generating neural network output data using the neural network, wherein parameters of the neural network have been calibrated, tuned, and quantized at memory cells of a magnetic memory device (MMD), and wherein in-memory calculation at the MMD is employed to generate the output data; and prior to quantizing the parameters at the MMD, and prior to generating the output data, executing a training of the parameters by updating the parameters based on backpropagation of error determined using the parameters and subsequently tuning the parameters based on determined conductance shifts of the memory cells of the MMD.

The non-transitory machine-readable medium of the preceding paragraph, wherein the operations further comprise: iteratively training the parameters that were tuned, being tuned parameters, the iterative training comprising updating the tuned parameters, performing backpropagation of additional error determined using the tuned parameters, and subsequently re-tuning the tuned parameters based on the determined conductance shifts.

The non-transitory machine-readable medium of any preceding paragraph, wherein the operations further comprise: generating conductance shifts of the memory cells of the MMD by setting a state of the MMD and sensing conductance of the memory cells of the MMD, the generating resulting in the determined conductance shifts.

The non-transitory machine-readable medium of any preceding paragraph, wherein the setting the state of the MMD comprises, prior to the sensing the conductance of the memory cells, setting an array of the memory cells of the MMD to a same conductance of −1, 0 or 1.

Example Operating Environment

Figure 17:
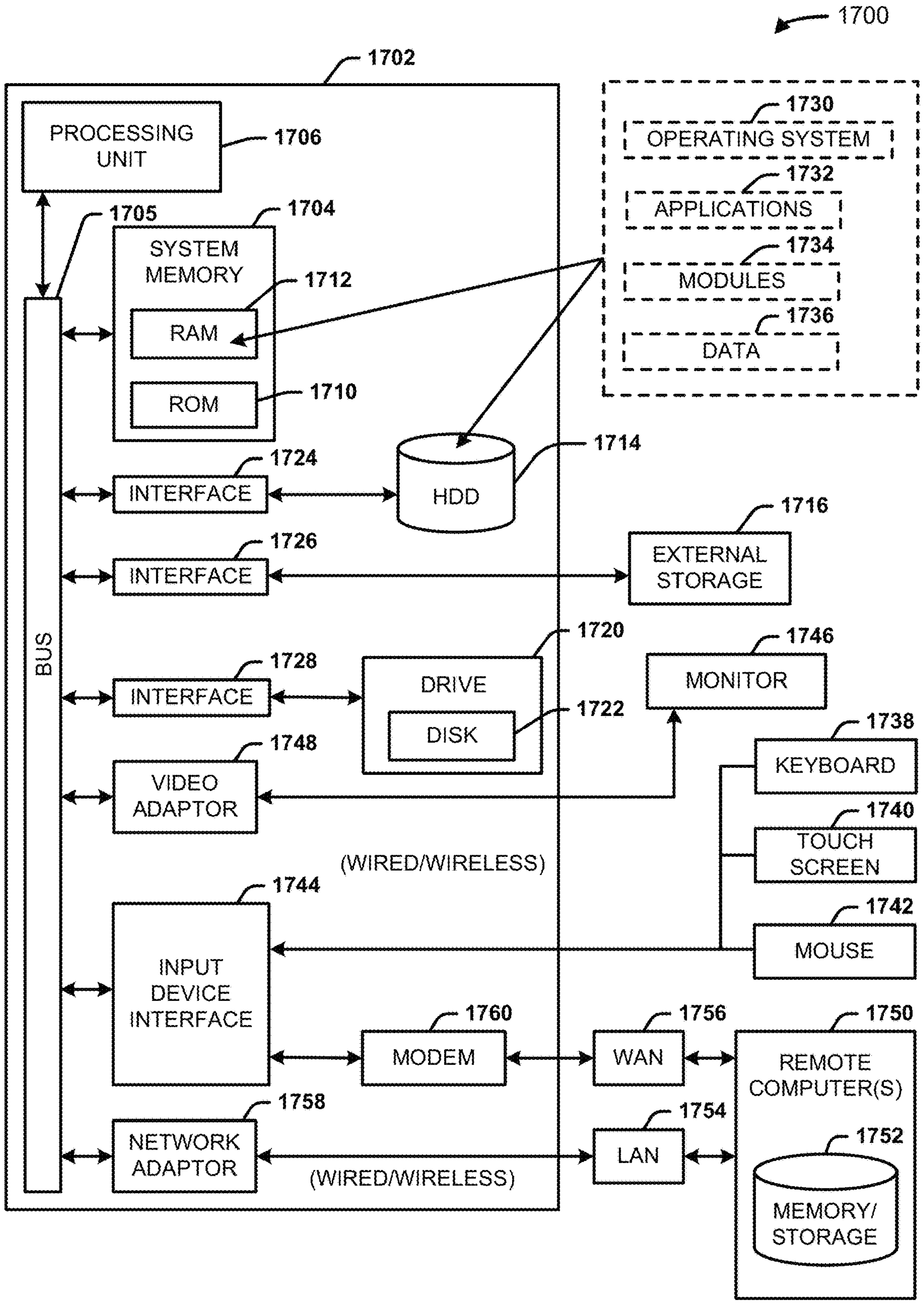
FIG. 17 illustrates a block diagram of an example, non-limiting, operating environment in which one or more embodiments described herein can be operated.
Figure 18:
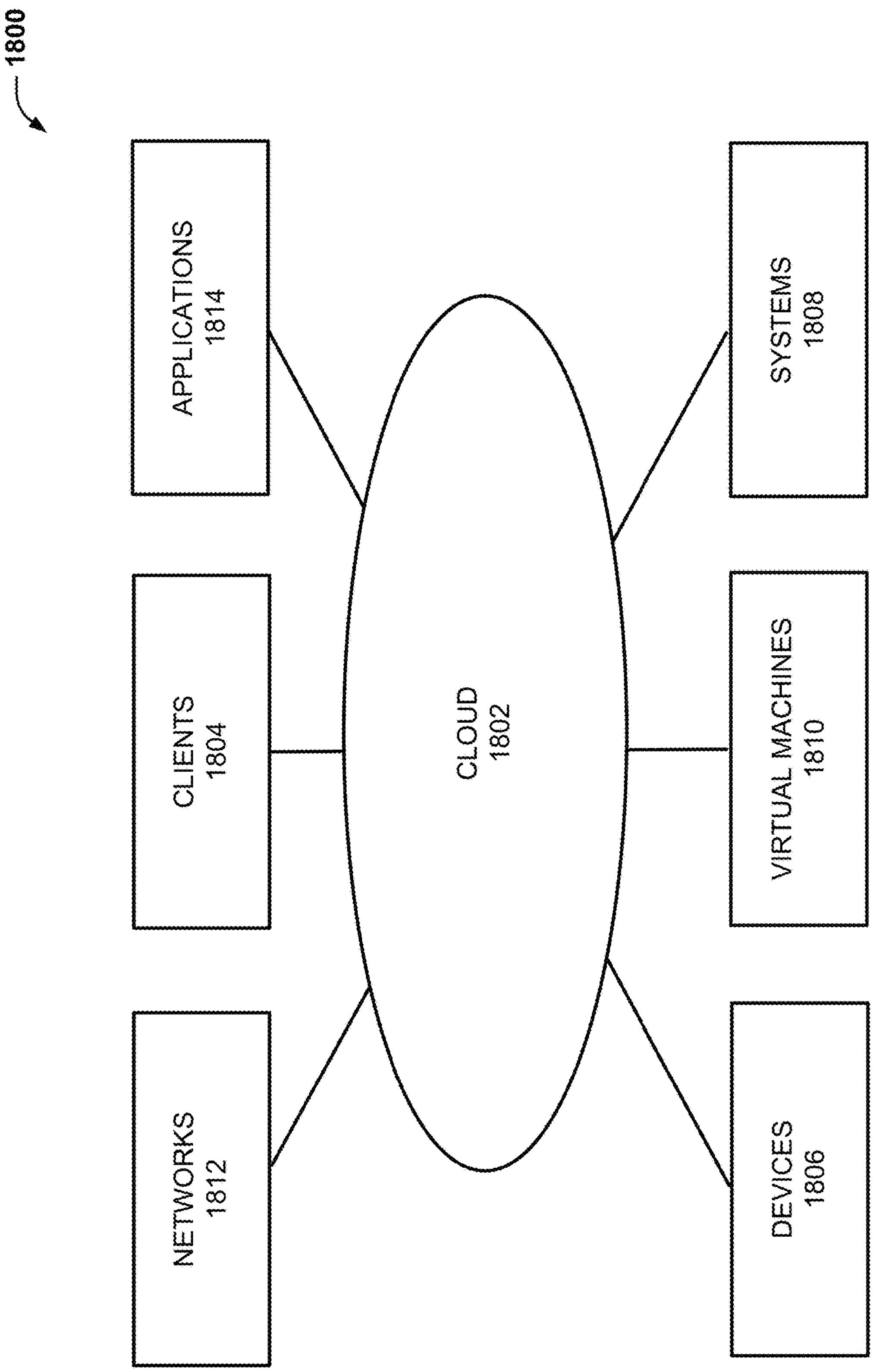
FIG. 18 illustrates a block diagram of an example, non-limiting, cloud computing environment in which or with which the system of FIG. 2 can operate, in accordance with one or more embodiments described herein.

Turning next to FIGS. 17 and 18, a detailed description is provided of additional context for the one or more embodiments described herein at FIGS. 1-16.

FIG. 17 and the following discussion are intended to provide a brief, general description of a suitable operating environment 1700 in which one or more embodiments described herein at FIGS. 1-16 can be implemented. For example, one or more components and/or other aspects of embodiments described herein can be implemented in or be associated with, such as accessible via, the operating environment 1700. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the afore-described methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD), and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory, and/or computer-readable media that are not only propagating transitory signals per se.

Computer-readable storage media can be accessed by one or more local or remote computing devices, e.g., via access requests, queries, and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared, and/or other wireless media.

With reference still to FIG. 17, the example operating environment 1700 for implementing one or more embodiments of the aspects described herein can include a computer 1702, the computer 1702 including a processing unit 1706, a system memory 1704 and/or a system bus 1705. One or more aspects of the processing unit 1706 can be applied to processors such as processor 104, 204 of the non-limiting system 100, 200. The processing unit 1706 can be implemented in combination with and/or alternatively to the processor 106, 206.

Memory 1704 can store one or more computer and/or machine readable, writable and/or executable components and/or instructions that, when executed by processing unit 1706 (e.g., a classical processor, and/or like processor), can provide performance of operations defined by the executable component(s) and/or instruction(s). For example, memory 1704 can store computer and/or machine readable, writable, and/or executable components and/or instructions that, when executed by processing unit 1706, can provide execution of the one or more functions described herein relating to the non-limiting system 100, 200, as described herein with or without reference to the one or more figures of the one or more embodiments.

Memory 1704 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM), and/or the like) that can employ one or more memory architectures.

Processing unit 1706 can comprise one or more types of processors and/or electronic circuitry (e.g., a classical processor and/or like processor) that can implement one or more computer and/or machine readable, writable and/or executable components and/or instructions that can be stored at memory 1704. For example, processing unit 1706 can perform one or more operations that can be specified by computer and/or machine readable, writable, and/or executable components and/or instructions including, but not limited to, logic, control, input/output (I/O), arithmetic, and/or the like. In one or more embodiments, processing unit 1706 can be any of one or more commercially available processors. In one or more embodiments, processing unit 1706 can comprise one or more central processing unit, multi-core processor, microprocessor, dual microprocessors, microcontroller, System on a Chip (SOC), array processor, vector processor, and/or another type of processor. The examples of processing unit 1706 can be employed to implement one or more embodiments described herein.

The system bus 1705 can couple system components including, but not limited to, the system memory 1704 to the processing unit 1706. The system bus 1705 can comprise one or more types of bus structure that can further interconnect to a memory bus (with or without a memory controller), a peripheral bus, and/or a local bus using one or more of a variety of commercially available bus architectures. The system memory 1704 can include ROM 1710 and/or RAM 1712. A basic input/output system (BIOS) can be stored in a non-volatile memory such as ROM, erasable programmable read only memory (EPROM) and/or EEPROM, which BIOS contains the basic routines that help to transfer information among elements within the computer 1702, such as during startup. The RAM 1712 can include a high-speed RAM, such as static RAM for caching data.

The computer 1702 can include an internal hard disk drive (HDD) 1714 (e.g., EIDE, SATA), one or more external storage devices 1716 (e.g., a magnetic floppy disk drive (FDD), a memory stick or flash drive reader, a memory card reader and/or the like) and/or a drive 1720, e.g., such as a solid state drive or an optical disk drive, which can read or write from a disk 1722, such as a CD-ROM disc, a DVD, a BD and/or the like. Additionally, and/or alternatively, where a solid-state drive is involved, disk 1722 could not be included, unless provided separately. While the internal HDD 1714 is illustrated as located within the computer 1702, the internal HDD 1714 can also be configured for external use in a suitable chassis (not shown). Additionally, while not shown in operating environment 1700, a solid-state drive (SSD) can be used in addition to, or in place of, an HDD 1714. The HDD 1714, external storage device(s) 1716 and drive 1720 can be connected to the system bus 1705 by an HDD interface 1724, an external storage interface 1726 and a drive interface 1728, respectively. The HDD interface 1724 for external drive implementations can include at least one or both of Universal Serial Bus (USB) and Institute of Electrical and Electronics Engineers (IEEE) 1794 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1712, including an operating system 1730, one or more applications 1732, other program modules 1734 and/or program data 1736. All or portions of the operating system, applications, modules, and/or data can also be cached in the RAM 1712. The systems and/or methods described herein can be implemented utilizing one or more commercially available operating systems and/or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In a related embodiment, operating system 1730 can comprise one virtual machine (VM) of multiple VMs hosted at computer 1702. Furthermore, operating system 1730 can provide runtime environments, such as the JAVA runtime environment or the .NET framework, for applications 1732. Runtime environments are consistent execution environments that can allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and/or settings for an application.

Further, computer 1702 can be enabled with a security module, such as a trusted processing module (TPM). For instance, with a TPM, boot components hash next in time boot components and wait for a match of results to secured values before loading a next boot component. This process can take place at any layer in the code execution stack of computer 1702, e.g., applied at application execution level and/or at operating system (OS) kernel level, thereby enabling security at any level of code execution.

An entity can enter and/or transmit commands and/or information into the computer 1702 through one or more wired/wireless input devices, e.g., a keyboard 1738, a touch screen 1740 and/or a pointing device, such as a mouse 1742. Other input devices (not shown) can include a microphone, an infrared (IR) remote control, a radio frequency (RF) remote control, and/or other remote control, a joystick, a virtual reality controller and/or virtual reality headset, a game pad, a stylus pen, an image input device, e.g., camera (s), a gesture sensor input device, a vision movement sensor input device, an emotion or facial detection device, a biometric input device, e.g., fingerprint and/or iris scanner, and/or the like. These and other input devices can be connected to the processing unit 1706 through an input device interface 1744 that can be coupled to the system bus 1705, but can be connected by other interfaces, such as a parallel port, an IEEE 1794 serial port, a game port, a USB port, an IR interface, a BLUETOOTH® interface, and/or the like.

A monitor 1746 or other type of display device can be alternatively and/or additionally connected to the system bus 1705 via an interface, such as a video adapter 1748. In addition to the monitor 1746, a computer typically includes other peripheral output devices (not shown), such as speakers, printers, and/or the like.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device and/or other common network node, and typically includes many or all of the elements described relative to the computer 1702, although, for purposes of brevity, only a memory/storage device 1752 is illustrated. Additionally, and/or alternatively, the computer 1702 can be coupled (e.g., communicatively, electrically, operatively, optically and/or the like) to one or more external systems, sources, and/or devices (e.g., computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and/or non-proprietary communication protocols. In a related example, one or more embodiments described herein can include hardware (e.g., a central processing unit (CPU), a transceiver, a decoder, and/or the like), software (e.g., a set of threads, a set of processes, software in execution and/or the like) and/or a combination of hardware and/or software that provides communicating information among one or more embodiments described herein and external systems, sources, and/or devices (e.g., computing devices, communication devices and/or the like).

The logical connections depicted include wired/wireless connectivity to a local area network (LAN) 1754 and/or larger networks, e.g., a wide area network (WAN) 1756. LAN and WAN networking environments can be commonplace in offices and companies and can provide enterprise-wide computer networks, such as intranets, all of which can connect to a global communications network, e.g., the Internet.

When used in a LAN networking environment, the computer 1702 can be connected to the local network 1754 through a wired and/or wireless communication network interface or adapter 1758. The adapter 1758 can provide wired and/or wireless communication to the LAN 1754, which can also include a wireless access point (AP) disposed thereon for communicating with the adapter 1758 in a wireless mode.

When used in a WAN networking environment, the computer 1702 can include a modem 1760 and/or can be connected to a communications server on the WAN 1756 via other means for establishing communications over the WAN 1756, such as by way of the Internet. The modem 1760, which can be internal and/or external and a wired and/or wireless device, can be connected to the system bus 1705 via the input device interface 1744. In a networked environment, program modules depicted relative to the computer 1702 or portions thereof can be stored in the remote memory/storage device 1752. The network connections shown are merely exemplary and one or more other means of establishing a communications link among the computers can be used.

When used in either a LAN or WAN networking environment, the computer 1702 can access cloud storage systems or other network-based storage systems in addition to, and/or in place of, external storage devices 1716 as described above, such as but not limited to, a network virtual machine providing one or more aspects of storage and/or processing of information. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, such as with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices and/or entities operatively disposed in wireless communication, e.g., a printer, scanner, desktop, and/or portable computer, portable data assistant, communications satellite, telephone, and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 10, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1002 described below with reference to illustration 1000 of FIG. 10. For instance, one or more embodiments described herein and/or components thereof can employ such one or more resources to execute one or more: mathematical function, calculation and/or equation; computing and/or processing script; algorithm; model (e.g., artificial intelligence (AI) model, machine learning (ML) model, deep learning (DL) model, and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed. That is, the one or more embodiments described herein can be implemented in a local environment only, and/or a non-cloud-integrated distributed environment, for example.

A cloud computing environment can provide one or more of low coupling, modularity and/or semantic interoperability. At the heart of cloud computing is an infrastructure that includes a network of interconnected aspects.

Moreover, the non-limiting system 100, 200, and/or the example operating environment 1700 of FIG. 17, can be associated with and/or be included in cloud-based and/or partially-cloud-based system.

Referring now to details of one or more elements illustrated at FIG. 18, the illustrative cloud computing environment 1802 is depicted. Cloud computing environment 1802 can comprise one or more cloud computing nodes, virtual machines, and/or the like with which local computing devices used by cloud clients 1804, such as for example via one or more devices 1806, systems 1808, virtual machines 1810, networks 1812, and/or applications 1814.

The one or more cloud computing nodes, virtual machines and/or the like can be grouped physically or virtually, in one or more networks, such as local, distributed, private, public clouds, and/or a combination thereof. The cloud computing environment 1802 can provide infrastructure, platforms, virtual machines, and/or software for which a client 1804 does not maintain all or at least a portion of resources on a local device, such as a computing device. The various elements 1806 to 1812 are not intended to be limiting and are but some of various examples of computerized elements that can communicate with one another and/or with the one or more cloud computing nodes via the cloud computing environment 1802, such as over any suitable network connection and/or type.

CONCLUSION

The embodiments described herein can be directed to one or more of a system, a method, an apparatus, and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device, and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA), and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures, and/or the like that perform particular tasks and/or implement particular abstract data types. Moreover, the afore-described computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or beneficial over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

at least one memory that stores computer executable components; and at least one processor that executes the computer executable components stored in the at least one memory to perform operations comprising:

determining conductance errors of memory cells of a magnetic memory device (MMD) based on a specified state of the MMD and based on sensed conductances of the memory cells at the specified state, resulting in a plurality of known conductance shifts of the MMD; and tuning a plurality of initially calibrated parameters of a neural network, the tuning comprising mapping the plurality of initially calibrated parameters to the memory cells using the plurality of known conductance shifts of the MMD, resulting in a set of primarily trained parameters.

2. The system of claim 1, wherein determining the known conductance shifts of the MMD comprises:

sensing respective conductance shifts of the memory cells of the MMD and outputting the sensed respective conductance shifts as the set of known conductance shifts; and generating a lookup table of the set of known conductance shifts corresponding to an array of the memory cells of the MMD, wherein the lookup table is employed to tune the initially calibrated parameters.

3. The system of claim 1, wherein determining the known conductance shifts of the MMD comprises:

sensing conductance values of the memory cells, being the sensed conductances, at a plurality of selected states of the MMD, wherein each selected state of the MMD comprises the memory cells of an array of the MMD being set to a same conductance value of −1, 0 or 1.

4. The system of claim 1, wherein conductance values of the memory cells at a selected state of the MMD comprise a combination of conductance values of −1, 0 and 1 of the memory cells.

5. The system of claim 1, wherein the operations further comprise:

initially calibrating original parameters comprising increasingly adding noise to the original parameters, resulting in noisy original parameters, and subsequently employing backpropagation to update the noisy original parameters, the initially calibrating resulting in the plurality of initially calibrated parameters.

6. The system of claim 5, wherein the initially calibrating the original parameters is executed according to a same process regardless of a number of bits comprised by the original parameters.

7. The system of claim 1, wherein the operations further comprise:

further iteratively training the set of primarily trained parameters, based on the tuning, comprising employing backpropagation using determined errors to update the plurality of primarily trained parameters, resulting in a plurality of intermediately calibrated parameters.

8. The system of claim 7, wherein the operations further comprise:

further iteratively training the plurality of intermediately calibrated parameters, using the plurality of known conductance shifts, resulting in a set of secondarily trained parameters.

9. The system of claim 1, wherein the operations further comprise:

directing operation of the MMD using input data for an on-chip inference at the MMD, resulting in output data that is based on the plurality of known conductance shifts of the memory cells of the MMD and that employs the plurality of primarily trained parameters.

10. The system of claim 9, wherein neural network output data, resulting from employing the plurality of secondarily trained parameters at a neural network, has a higher level of accuracy than other neural network output data resulting from employing the primarily trained parameters at the neural network.

11. A method, comprising:

quantizing neural network parameters at a magnetic memory device (MMD);

executing first calibrations of the parameters, wherein the first calibrations comprise determining a first error resulting from a first forward calculation pass of first data using the parameters and backpropagating the first error to update the parameters, wherein the first calibrations are executed using selectively increasing levels of noise added to the parameters prior to the first forward calculation pass, and wherein the executing the first calibrations results in initially calibrated parameters;

determining a conductance error of the MMD, based on a specified state of the MMD and based on a sensed conductance of the MMD, resulting in a determined conductance shift of the MMD; and tuning the initially calibrated parameters using the determined conductance shifts of the MMD, resulting in primarily trained parameters.

12. The method of claim 11, further comprising:

executing iterative training of the primarily trained parameters, wherein the iterative training comprises executing one or more series of calibrating and tuning processes comprising:

determining a second error resulting from a second forward calculation pass corresponding to the primarily trained parameters, backpropagating the second error to update the primarily trained parameters, wherein the executing the second calibrations results in intermediately calibrated parameters, and tuning the intermediately calibrated parameters using the determined conductance shift, resulting in secondarily trained parameters, wherein the executing the iterative training increases an accuracy of output data of an in-memory computing process using the secondarily trained parameters relative to the executing of the first calibrations.

13. The method of claim 11, wherein the executing the first calibrations of the parameters using the MMD is performed according to a same process regardless of a number of bits comprised by parameters.

14. The method of claim 11, wherein the noise employed mimics analog noise of an inference process executed on-chip using the MMD.

15. The method of claim 11, wherein the MMD is a first MMD, and further comprising:

performing, relative to a second MMD instead of the first MMD, a second iteration of the executing the first calibrations, determining, and tuning a second set of neural network parameters, resulting in a second set of primarily training parameters;

employing the second set of primarily trained parameters, having been quantized at the second MMD, and employing the primarily trained parameters, having been quantized at the first MMD, to evaluate experimental data using the first MMD and the second MMD.

16. The method of claim 15, wherein the experimental data comprises analog data or digital data, wherein the experimental data is output from a neural network, and wherein an MMD output based on the experimental data is analyzed by the neural network resulting in a neural network output.

17. A non-transitory machine-readable medium, comprising executable instructions that, when executed by at least one processor, facilitate performance of operations, comprising:

based on input data obtained via a neural network, generating neural network output data using the neural network, wherein parameters of the neural network have been calibrated, tuned, and quantized at memory cells of a magnetic memory device (MMD), and wherein in-memory calculation at the MMD is employed to generate the output data; and prior to quantizing the parameters at the MMD, and prior to generating the output data, executing a training of the parameters by updating the parameters based on back-propagation of error determined using the parameters and subsequently tuning the parameters based on determined conductance shifts of the memory cells of the MMD.

18. The non-transitory machine-readable medium of claim 17, wherein the operations further comprise:

iteratively training the parameters that were tuned, being tuned parameters, the iterative training comprising updating the tuned parameters, performing backpropagation of additional error determined using the tuned parameters, and subsequently re-tuning the tuned parameters based on the determined conductance shifts.

19. The non-transitory machine-readable medium of claim 17, wherein the operations further comprise:

generating conductance shifts of the memory cells of the MMD by setting a state of the MMD and sensing conductance of the memory cells of the MMD, the generating resulting in the determined conductance shifts.

20. The non-transitory machine-readable medium of claim 19, wherein the setting the state of the MMD comprises, prior to the sensing the conductance of the memory cells, setting an array of the memory cells of the MMD to a same conductance of −1, 0 or 1.

* * * * *